US005613013A

United States Patent [19]

Schuette

[11] Patent Number: 5,613,013

[45] Date of Patent: Mar. 18, 1997

[54] GLASS PATTERNS IN IMAGE ALIGNMENT AND ANALYSIS

[75] Inventor: Wade Schuette, Ann Arbor, Mich.

[73] Assignee: Reticula Corporation, Ann Arbor, Mich.

[21] Appl. No.: 242,565

[22] Filed: May 13, 1994

[51] Int. Cl.$^6$ ..................................... G06K 9/00
[52] U.S. Cl. ..................... 382/124; 382/293; 382/295; 382/296; 356/363; 356/374
[58] Field of Search ................. 382/41, 44, 46, 382/4, 45, 276, 293, 296, 295, 124; 356/363, 374

[56] References Cited

U.S. PATENT DOCUMENTS

| | | | |
|---|---|---|---|
| 3,689,162 | 9/1972 | Ferguson | 356/169 |
| 3,690,881 | 9/1972 | King | 96/27 |
| 3,783,520 | 1/1974 | King | 356/363 |
| 4,025,898 | 5/1977 | Shaw | 382/4 |
| 4,541,113 | 9/1985 | Seufert et al. | 382/4 |
| 5,052,807 | 10/1991 | Juday | 356/375 |
| 5,054,929 | 10/1991 | Dey | 356/401 |
| 5,076,662 | 12/1991 | Shih | 382/42 |
| 5,107,293 | 4/1992 | Sekine et al. | 354/430 |
| 5,155,774 | 10/1992 | Numagami | 382/1 |
| 5,164,997 | 11/1992 | Kumagai | 382/44 |
| 5,172,190 | 12/1992 | Kaiser | 356/401 |
| 5,196,683 | 3/1993 | Marom | 382/1 |
| 5,251,271 | 10/1993 | Fling | 382/44 |
| 5,295,200 | 3/1994 | Boyer | 382/45 |

OTHER PUBLICATIONS

Glass, Leon, "Moiré Effect from Rardom Dots", Nature vol. 223, Aug. /1969, pp. 578–580.

IEEE Transactions on Pattern Analysis and Image Intel., vol. 14 No. 11 Nov. 1992 "Projection–Based Approach to Image anal. . . ." Greenspan et al, pp. 1105–1110.

Proceedings of SPIE –The International Society for Optical Engineering, vol. 432, pp. 222–239, 1983 Kashet.

IEEE Trans. on Pattrn. Anal. & Mach. Intel., vol. 15, No. 5, May, 1993, "Digital Analysis of Rotated Images", pp. 499–503, by Stefano Alliney.

IEEE Trans. on Pattrn. Anal. & Mach. Intell, vol. PAMI–7, #3, May, 1985, "Contour Map Registration Using Fourier Descriptors of Gradient Codes", pp. 332–338, by K. P. Lam.

IEEE Trans. on Pattrn. Anal. & Mach. Intel., vol. PAMI–7, #3, May, 1985, "Template Matching and Rotated Images", pp. 338–344, by Ardeshir Goshtasby.

SPIE, vol. 1070, Recon. Astronomy, Remote Sensing, & Photo., 1989, "Scene Registration in Aerial Image Analysis", pp. 88–99; by Perlant and McKeown.

*Primary Examiner*—Jose L. Couso
*Assistant Examiner*—Anh Hong Do
*Attorney, Agent, or Firm*—Brooks & Kushman P.C.

[57] ABSTRACT

A system and method is provided for aligning and analyzing multiple images using Glass patterns. A Glass pattern is a Moiré-like pattern obtained by superimposing an image on a transformed version of itself. The method includes superimposing the images to produce a first Glass pattern which has a determinable reference point, repositioning at least one of the images to produce a subsequent Glass pattern having a different reference point, and simultaneously aligning the reference points of each of the Glass patterns so as to align the images. The reference points are determined by any of a number of methods including the use of Fourier Transforms. In various embodiments of the invention, information obtained from the nature and quality of the Glass patterns produced is utilized for image analysis without aligning the images.

48 Claims, 14 Drawing Sheets

Fig. 1

GLASS PATTERNS IN IMAGE ALIGNMENT AND ANALYSIS

TECHNICAL FIELD

The present invention relates to a system and method for aligning a plurality of images utilizing Glass patterns.

BACKGROUND OF THE INVENTION

Image processing is a rapidly changing field which permeates a myriad of applications. Image alignment (also known as image registration) is a difficult task which must often be completed before further processing of the information contained in an image. Advances in digital computer information processing and storage technology have made the digital computer the instrument of choice when attempting to solve a complex image processing problem such as image alignment.

A survey of current image registration problems and solutions is presented by Lisa Gottesfeld Brown in "A Survey of Image Registration Techniques", *ACM Computing Surveys*, 24(4):326–376 (December 1992).

For purposes of this application, the term "image" is used in its broadest sense. An image may be defined as a spatial distribution of a physical property, such as radiation, electric conductivity, or reflectivity, mapped from another distribution of either the same or a different physical property. Mathematically, an image may be described as a mapping from a domain in N-dimensional space to a range in P-dimensional space, where N and P are generally small integers, although extensions to fractional dimensions may be possible as well. The range may be single-valued, such as a number, or it may require a more complex representation, such as a vector, tensor, or a color.

Thus, an image may be that which is traditionally thought of as a single two-dimensional (2D) picture, a single three-dimensional (3D) picture such as a hologram, or a series of 2D or 3D pictures taken over time so as to add a fourth dimension. An image may also be of higher dimensionality such that it is difficult or impossible to visualize in the traditional sense, but may still be manipulated mathematically and operated on by a digital computer. This generalized notion of an image encompasses various types of multi-dimensional data or data structures such as those which may be used in establishing common areas of belief between two communicating agents, or in locating some data in a database by matching with an image of the desired data.

The process of aligning two or more images, then, consists of determining the relationship between their domains. This process involves identifying a mapping function or transformation which maps points in the first domain to corresponding points in the second domain. Since the images may represent data acquired at different times, from different sensors, at different magnifications, or at different angles, what may at first seem to be a relatively simple task becomes quite arduous.

For example, consider the task of aligning images which represent data acquired from entirely different modalities, such as aligning an optical image with a similar radar image, or aligning a computed tomography (CT) scan with a similar positron emission tomography (PET) scan. Since the CT scan is normally a high-resolution grayscale image and the PET scan is a low resolution, false color image, it is likely that no point in one image is identical to any point in the other. Still, it is desirable to align features present in both images. Similarly, images of the same scene captured in different spectral channels in a remote sensing application may be quite different in appearance, even when properly aligned. Such tasks may easily become intractable for the typical human or the most powerful digital computer.

Variations among images to be aligned further complicate the alignment process. Variations may be of several types, some of which are desirable while others are undesirable. For example, undesirable variations may result from sensor distortion when acquiring the image, or noise in the image data. Desirable variations may include changes or movement of at least a portion of the subject matter of the image, such as movement due to cell growth in medical diagnostic applications, or change due to the construction of a building in aerial reconnaissance applications. Desirable variations are often enhanced by post-processing techniques after the alignment process is completed, whereas undesirable variations are preferably eliminated prior to image alignment.

A meaningful alignment of a number of images can be achieved even though most, if not all, points in one image have no obvious corresponding point in another image, as discussed above. To accommodate variations in the images to be aligned, each image may be assigned a coordinate system having an arbitrary reference point as its origin. The alignment process, then, consists of determining the mapping function or transformations among the various coordinate systems. This may be a local transformation which maps a portion of a first image to a portion of a second image, or a global transformation which maps the entire first image onto the second image.

A number of techniques have been developed for use in image alignment. Many methods utilize known landmarks or artificial reference points specifically inserted to assist in the alignment process. Knowledge of the particular class of transformation between images is employed to speed the alignment process since an exhaustive search over all possible transformations is time prohibitive. Prior knowledge of the type of transformation may also increase the confidence level of the alignment since one particular method may be better suited to detect a particular transformation.

A number of methods which relate to image alignment involve pattern recognition or template matching. These methods attempt to match a reference template or pattern to at least a portion of the subject image. To accomplish this, a match metric is used which operates as a measure of the similarity between the reference pattern and the image. A statistical method, such as determining a cross-correlation of the image and the template, is often utilized for this type of application. However, the cross-correlation must be computed for each allowable transformation of the template. The results of this exhaustive search over all possible transformations are then utilized to determine a best constant transformation across the entire image. Thus, this method has utility only in determining an aligning transformation which includes a small range of translations, rotations, and scale changes. As the number of transformations grows, this method quickly becomes computationally prohibitive. For example, to examine all combinations of 100 possible values for horizontal and vertical displacements, rotation angles, and scale shifts, would require $10^8$ tests.

It would be desirable, therefore, to have an alignment method which did not require an exhaustive search over all possible transformations such that a wider range of translations, rotations, and scale changes could be accommodated without becoming computationally unmanageable.

Fourier methods transform the information represented in an image from the spatial domain to the frequency domain.

As a class, these methods are particularly amenable to aligning images which contain significant correlated and frequency-dependent, or narrow-band, noise. Furthermore, the Fourier methods also offer computational advantages over traditional statistical correlation methods which operate on the spatial domain representation of the images.

Phase correlation is a Fourier method which may be utilized to align images which have been translated relative to one another. Some improvements to basic phase correlation have extended its application to images which have been rotated as well as translated. More general transformations among images, however, are not suitable for detection utilizing phase correlation methods. Furthermore, relatively small local variations among images greatly reduce the likelihood of a successful alignment or match when using these methods.

Therefore, it would be desirable to have an image alignment method which would accommodate general transformations while tolerating noise present in the data of the image.

It would also be desirable to have an image alignment method capable of reliably registering two images which have small local variations.

As previously mentioned, some image alignment techniques utilize known landmarks or artificial reference points to speed the alignment process. Manual identification of a relatively stationary landmark is often used in conjunction with computerized matching. Of course, manual identification of a stationary landmark normally requires some expertise in the discipline of the underlying application for which the image processing is being performed. For example, manual identification of a stationery landmark in medical diagnostic applications would require knowledge of the location of stationary anatomical structures within the images to be aligned.

Automatic identification of common features among images may also be utilized for image alignment. This method involves searching for unique features present in the images to be aligned. Such features may include corners, line intersections, or distinctive contours. Since a global transformation is often determined based on the alignment of these features, it is important to identify a sufficient number of features to assure an alignment having a predetermined confidence level. However, an increased number of features will be more difficult to match since there may be local movement or noise in the images. Therefore, computational time increases dramatically to achieve an acceptable confidence level for the image alignment.

Automatic identification is more easily performed on artificially inserted reference points, also called fiducial markers. The fiducial markers are often identified using one of the template or pattern matching methods discussed above. Once the fiducial markers have been located in the images to be aligned, they may be used to determine a global transformation so as to align the remaining image points. This type of alignment strategy is particularly useful for determining complex transformations between images acquired through different imaging modalities since an appropriate fiducial marker may be chosen for each of the modalities. Unfortunately, this strategy is not suitable for a number of applications, such as aerial reconnaissance, due to the difficulty associated with placing a reliable fiducial marker in potentially hostile areas, including the middle of a desert or an adversarial military installation.

It would be desirable, therefore, for an image alignment method to reliably register images without the use of fiducial markers.

It would also be desirable for an image alignment method to accurately align images in which easily identifiable features are absent, or are present in such a large number that identification becomes perplexing, such as an image of a brick wall, a jungle canopy, or nuclear reactor control rods.

Point mapping techniques are often used when feature recognition is difficult or ambiguous. These techniques use a number of sophisticated search strategies which may include relaxation, cooperation or hierarchical searching to identify common points among images to be aligned or registered. Statistical methods, such as correlation, are frequently used to identify common points. Once a number of common points have been located, a global transformation is computed, similar to the methods using fiducial markers.

Any general transformation can be determined through approximation or interpolation, given a sufficient number of points. The number of points required depends on the type of transformation, the noise present in the images, local variations, and the confidence level desired, among other factors. As with previously discussed methods, these methods require a compromise between accuracy and computation time and for many applications, they are computationally prohibitive. Furthermore, utilization of statistical methods requires a relatively large number of matching points for acceptable accuracy. This makes the method unacceptable for use with images having local variations since sample points located within an area of local variation would appear as distortions when compared to those outside of the area.

It would be desirable for an image alignment method to be computationally feasible while providing accurate alignment of images related by a general transformation.

It would also be desirable for an image alignment method to properly align images having local variations.

A more recently developed image registration technique employs elastic, or "rubber-sheet" models to perform image warping. These techniques characterize the deformation of one image relative to another by the energy state associated with the elastic model. The registration transformation is determined by a minimum-energy state deformation of the elastic model which matches the image to be aligned or registered. The minimum-energy state is most often determined iteratively using standard numerical methods. A variety of methods for digital image warping may be found in the book by George Wolberg, *Digital Image Warping*, IEEE Computer Society Press: Los Alamitos, California (1990). These techniques are capable of determining some of the most complex transformations while managing local variations as well. However, they are computationally intensive and require significant development to determine unique elastic models for each different application.

It would be desirable, therefore, to have a single image alignment method applicable to a variety of applications and capable of aligning multiple images which are related by complex transformations without being computationally prohibitive.

The term "periodic pattern" is used here to mean a spatial pattern which is, in a region of interest, a periodic function of one or more variables.

A "periodic function" $f(x)$ of a variable x is said to be periodic with period "a" if $f(x)$ is non-constant and if, over the region of interest, $f(x)=f(x+a)$.

Simple examples of periodic functions in normal rectilinear coordinates would be the familiar trigonometric sine and cosine curves and equally spaced horizontal or vertical lines, resembling venetian blinds or a picket fence.

A simple example of periodic function in circular coordinates rho and theta, where rho is the radial coordinate and theta is an angular coordinate measured from the x-axis, would be the classic "bulls-eye" target pattern of alternating white and black annular rings of equal width, measured radially.

This definition of "periodic pattern" is intended to include, as well, periodic functions of variables which are themselves transformations of the spatial coordinates, such as a bullseye pattern with rings which change width as the radius increases because the pattern is periodic in the inverse of the radius (ie 1/radius) not in the radial coordinate itself.

Periodic patterns of lines or circles are used in industry as the family of curves which are superimposed to create the moire patterns used for measuring alignment or displacement. Patterns of concentric circles, for instance, may be part of the mask for an integrated circuit.

Yet another image alignment technique exploits Moiré interference patterns in the alignment process. In general, a Moiré interference pattern is created by the superimposing of any two similar periodic structures which are misaligned. Since a periodic structure, such as equally spaced parallel lines or concentric circles, is required for this phenomenon to be present, the structure is normally artificially introduced into the images. This is accomplished by a variety of techniques such as printing, painting, or illumination. Successful alignment, then, involves identifying the Moiré pattern, locating a single center point of the pattern (or a light spot or dark spot), and attempting to eliminate the pattern by repositioning the image to be aligned relative to the reference image.

Repositioning the image typically involves iteratively rotating the image and utilizing a statistical metric, such as correlation, to determine a match. As previously discussed, this quickly becomes computationally prohibitive. Another significant disadvantage of this technique, as with the use of fiducial markers, is that many applications are simply not amenable to the introduction of an artificial reference pattern. Even with the pattern, determination of the "best" match requires locating the peak of what may be a broad and noisy distribution.

Thus, it would be desirable to have an image alignment method which does not rely on artificial reference patterns introduced into the images to be aligned.

Moiré interference patterns are often utilized in structural deformation analysis, as well. In these applications, the Moiré interference fringes are desirable since they indicate the magnitude and direction of a deformation in the image relative to the reference pattern. The alignment process is actually secondary to the deformation analysis and is completed by various other alignment methods which do not use the Moiré pattern. Furthermore, since the images are normally captured under controlled conditions, the alignment process is relatively simple and is often performed manually.

In a number of applications, Moiré interference fringes are undesirable. These applications have prompted the development of a number of methods and apparatus to eliminate them. For example, in television broadcasting, interference between scanning lines and a similar line pattern in the original scene (or the dot pattern of a shadow-mask picture tube), results in unwanted distortions in the transmitted picture. Care is taken in the design of broadcasting and receiving equipment to eliminate such interference when possible. Color printing is another application in which Moiré fringes present a problem rather than a solution. Misalignment of the various color masks often results in unwanted interference patterns in the finished product.

Most of the current image alignment methods are computationally intensive. This limits the utility of those methods in applications which require real-time processing of image data. Computer or machine vision applications requiring real-time image alignment and processing include: target identification and tracking; automated aviation take-offs, navigation, and landings; and, robotic inspection and task control, among a wide variety of other current and future applications. Thus, current image alignment methods and systems are inapplicable, or very expensive, to those applications requiring real-time image alignment.

It would be desirable, therefore, for an image alignment method to be computationally manageable so as to efficiently align multiple images for applications requiring real-time alignment of multiple images.

DISCLOSURE OF THE INVENTION

It is, therefore an object of the present invention to provide a system and method for image alignment which does not require an exhaustive search over all possible transformations so as to accommodate a wider range of translations, rotations, and scale changes without being computationally unmanageable.

It is another object of the present invention to provide a system and method for image alignment which accommodates general transformations while tolerating noise present in the data of the images.

Still another object of the present invention is to provide a system and method for image alignment capable of reliably aligning multiple images which have local attribute variations.

An additional object of the present invention is to provide a system and method for reliably aligning multiple images without the use of fiducial markers.

Yet another object of the present invention is to provide a system and method for image alignment which accurately aligns images having no easily identifiable features or landmarks.

Another object of the present invention is to provide a system and method for image alignment which accurately aligns images having a multitude of similar features.

A still further object of the present invention is to provide a system and method for image alignment which is computationally feasible while providing accurate alignment of images related by a general transformation.

Still another object of the present invention is to provide a system and method for image alignment suitable for a variety of diverse applications without significant adaptation.

A further object of the present invention is to provide a system and method for image alignment, capable of aligning multiple images which are related by complex, multi-dimensional transformations, without being computationally prohibitive.

Yet another object of the present invention is to provide a system and method for image alignment which does not rely upon the periodicity of artificial reference patterns present within the images to be aligned, but utilizes the intrinsic properties of the images.

Still another object of the present invention is to provide a system and method for image alignment which is computationally manageable so as to efficiently align multiple images for use in real-time image alignment applications.

In carrying out the above objects and other objects and features of the present invention, a method for aligning or analyzing multiple images is provided. The method includes superimposing the images to produce a first Glass pattern which has a determinable reference point, repositioning at least one of the images to produce a subsequent Glass pattern having a different reference point, and simultaneously aligning the reference points of each of the Glass patterns so as to align the images. As further explained below, a Glass pattern is a Moiré-like pattern obtained by superimposing an image on a transformed version of itself.

A system is also provided for implementing the method for aligning images using Glass patterns according to the present invention.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 illustrates a reference image to be aligned with subsequent images for use with the system and method according to the present invention.

BEST MODE (S) FOR CARRYING OUT THE INVENTION

Figure 1:
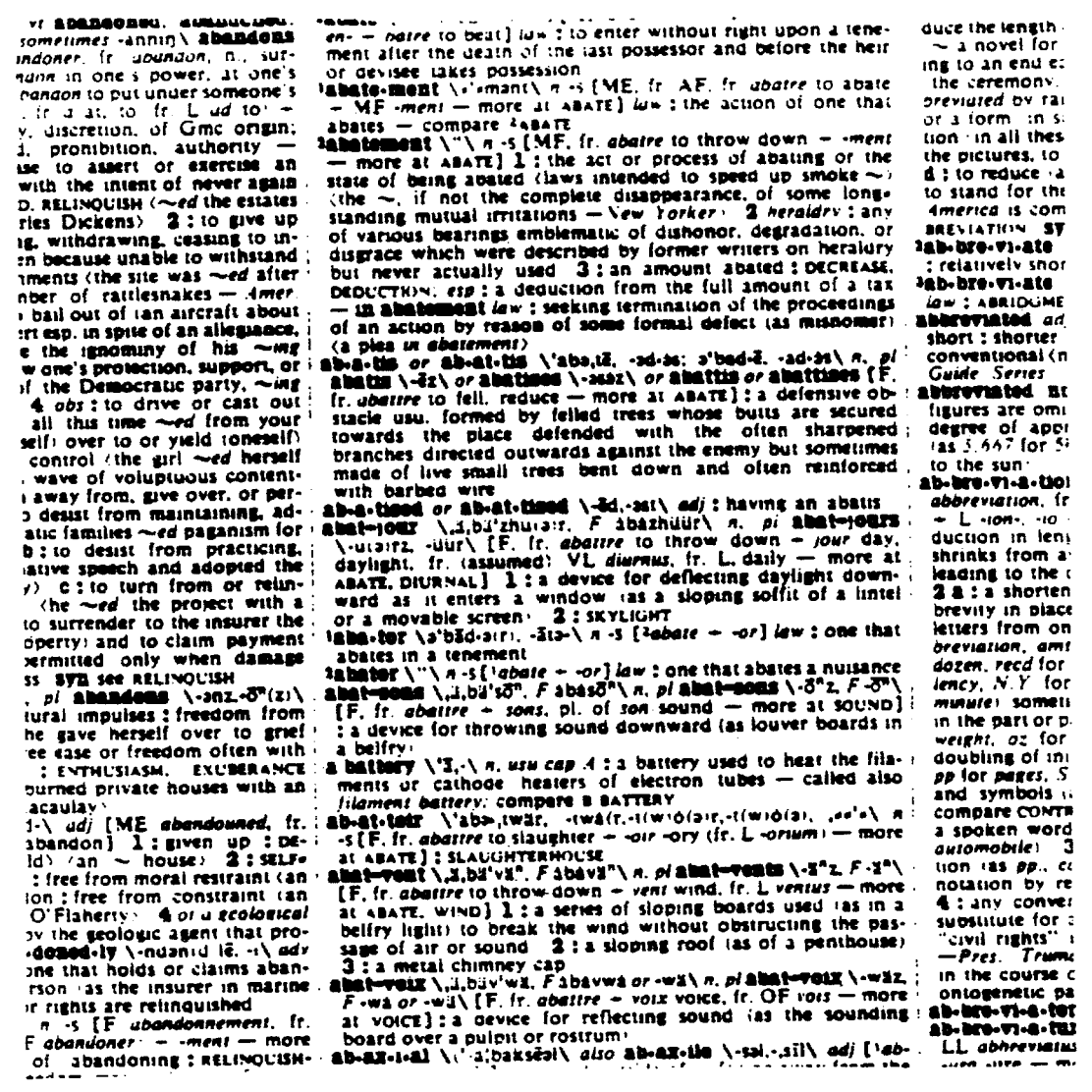

Referring now to FIG. 1, there is shown a reference image to be aligned with subsequent images according to the method of the present invention. This image is an excerpt from a standard dictionary of the English language, chosen at random. It is interesting to note that the system and method for aligning images using Glass patterns functions well with a wide variety of images. This example was chosen due to its ordinary character, ease of reproducibility, and common availability, to demonstrate the method of the present invention. The system and method of this invention function well not only with traditional "images", but also with the more generalized notion of "images" as discussed above.

Figures 2A, 2B:
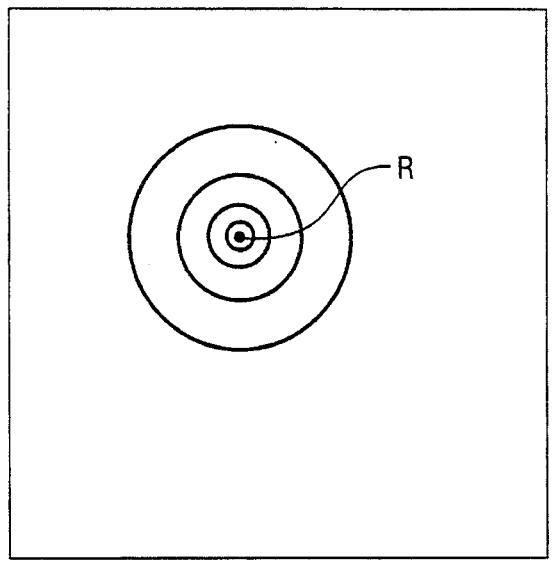
FIG. 2a illustrates a Glass pattern of concentric circles formed by superimposing the reference image of FIG. 1 with a rotated and translated version of that reference image according to the present invention.
FIG. 2b is a schematic representation of the Glass pattern of FIG. 2a illustrating the common reference point R at the center of the circles according to the present invention.

Referring now to FIGS. 2a and 2b, there is shown a typical Glass pattern which is utilized by the method for aligning images according to the present invention. Prior to this invention, Glass patterns have been described as perceptions of Moiré-like fringes obtained by superimposing an image of randomly distributed features on a transformed version of itself. These patterns were described as a phenomenon of human perception by Leon Glass in his article, "Moiré Effect from Random Dots", *Nature*, 223:578–580 (Aug. 9, 1969).

Human perception of Glass patterns was further explored in a paper by Leon Glass and Rafael Perez titled "Perception of Random Dot Interference Patterns", *Nature*, 246:360–362 (Dec. 7, 1973). In that paper, the morphology of Glass patterns was mathematically characterized. As explained in that paper, Glass patterns may be thought of as phase plane representations of two coupled, autonomous, linear differential equations corresponding to the transformation between the two misaligned images. A number of reference texts provide a rigorous mathematical treatment of ordinary differential equations and their solutions including the text by H. K. Wilson, *Ordinary Differential Equations*, pp.

293–294, Reading, Massachusetts: Addison-Wesley Publishing Company (1971).

Still another discussion of human perception of Glass patterns was presented by Kvetoslav Prazdny in his paper "On the perception of Glass patterns" *Perception*, 13:469–478 (1984). Prazdny hypothesized that a random-dot Glass pattern could be perceived because the human visual system could somehow detect local orientations and combine that information into a global percept.

Thus, Glass patterns have been characterized and investigated as a human perceptual phenomenon for a number of years. However, the utility of Glass patterns in image processing has not been recognized prior to the present invention. The system and method of the present invention not only recognize the utility of Glass patterns in aligning multiple traditional images, but expand the generation, recognition, and utilization of these patterns to generalized multi-dimensional images which are difficult, if not impossible, for a human to visualize or perceive.

FIG. 2b is a schematic representation of the Glass pattern created in FIG. 2a. This Glass pattern is produced when the superimposed image is of the same scale (magnification factor) and has been rotated and translated relative to the reference image illustrated in FIG. 1. This Glass pattern consists of a number of circles which are concentric about a common reference point, similar to a bull's-eye pattern. The reference point R in FIG. 2b represents a corresponding point between the superimposed images. This point is located near the letter "o" in the word "down" in FIG. 2a. For this type of Glass pattern, the reference point is called a center point due to the circular nature of the pattern.

A Glass pattern, similar to the pattern illustrated in FIGS. 2a and 2b, would also be produced if the superimposed image were merely rotated, and not translated, relative to the reference image. Translation of the superimposed image along a first arbitrary axis results in translation of the reference point along a second axis which is orthogonal to the first axis.

Figures 3A, 3B:
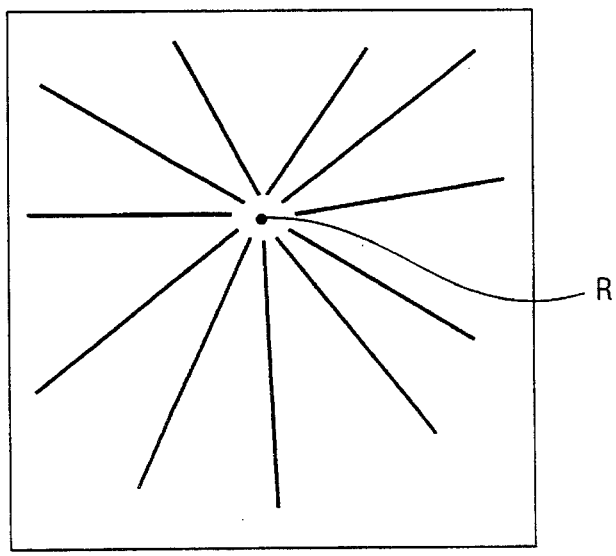
FIG. 3a illustrates a Glass pattern formed by superimposing the reference image of FIG. 1 with a scaled version of that reference image according to the present invention.
FIG. 3b is a schematic representation of the Glass pattern of FIG. 3a illustrating the common reference point according to the present invention.

A different type of Glass pattern is illustrated in FIGS. 3a and 3b. As with the previous Glass pattern, this Glass pattern was produced by superimposing a transformed version of the reference image of FIG. 1 upon that reference image. The transformation essentially consists of uniformly scaling the reference pattern of FIG. 1. This Glass pattern may be described as a starburst or infinite perspective pattern. The reference point for this type of pattern is called a node. As in the previous illustration, the reference point, R, is schematically illustrated in FIG. 3b. This point is located near the letter "o" in the word "down" in FIG. 3a and represents a point of correspondence between the two images.

In FIG. 3a, the superimposed image has been expanded substantially uniformly by 10% and has not been rotated any significant amount relative to the reference image. Of course, other scaling factors could be used to expand or contract the superimposed image, relative to the reference image, while still producing a Glass pattern. Depending on the type and content of an image, one particular scaling factor may enhance the pattern while another may diminish its distinctive character. For an image such as the image illustrated in FIG. 3a, a scaling factor roughly within the range of 0.8 to 1.2 is preferred so that the Glass pattern may be readily discerned.

Figures 4A, 4B:
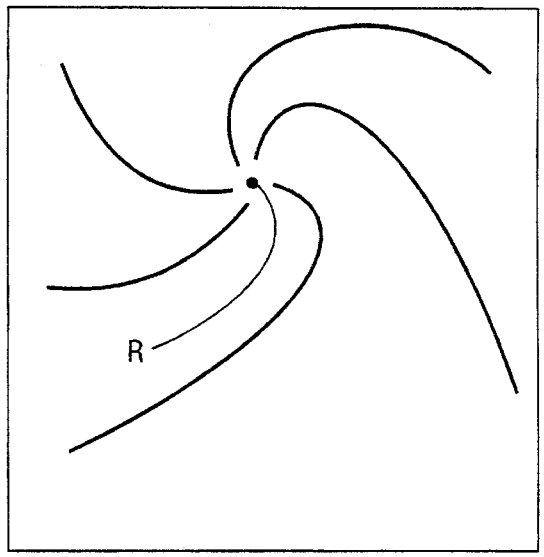
FIG. 4a illustrates a Glass pattern formed by superimposing the reference image of FIG. 1 with a rotated and scaled version of that reference image according to the present invention.
FIG. 4b is a schematic representation of the Glass pattern of FIG. 4a illustrating the common reference point according to the present invention.

Another type of Glass pattern is illustrated in FIGS. 4a and 4b. This pattern may be described as a vortex or vortical in nature. The transformation of the superimposed image in this illustration includes scaling as in FIGS. 3a and 3b, in addition to rotation. As before, the reference point R indicated in FIG. 4b corresponds to a point near the "o" in the word "down" of FIG. 4a. This reference point is known as a focus and is the point of correspondence between the superimposed image and the reference image.

Figure 5:
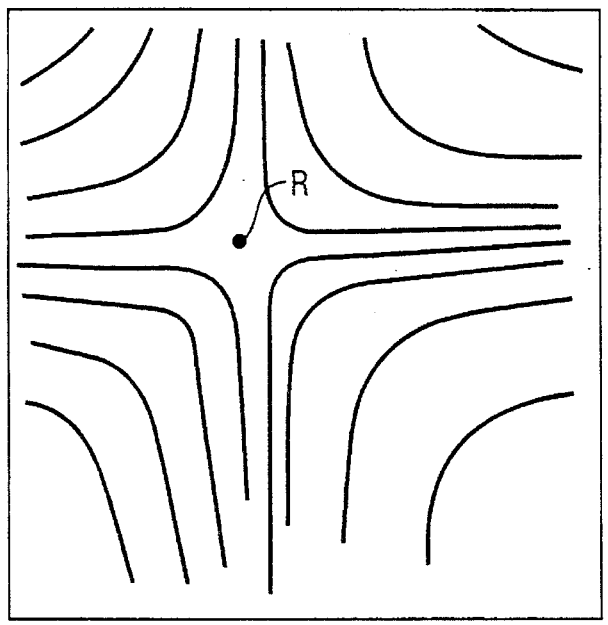
FIG. 5 is a schematic representation of a Glass pattern which is formed when a reference image is superimposed upon a transformed version of itself. The transformation includes expansion along a first axis and contraction along a second axis which is orthogonal to the first axis.

Still another variety of Glass pattern is illustrated schematically in FIG. 5. This variety of Glass pattern is hyperbolic in nature and its reference point is known as a saddle point. This pattern may be produced by utilizing different scaling factors in orthogonal directions. Thus, for a 2D image, expansion along a first axis and contraction along a second axis orthogonal to the first axis would result in the Glass pattern illustrated.

Figure 6:
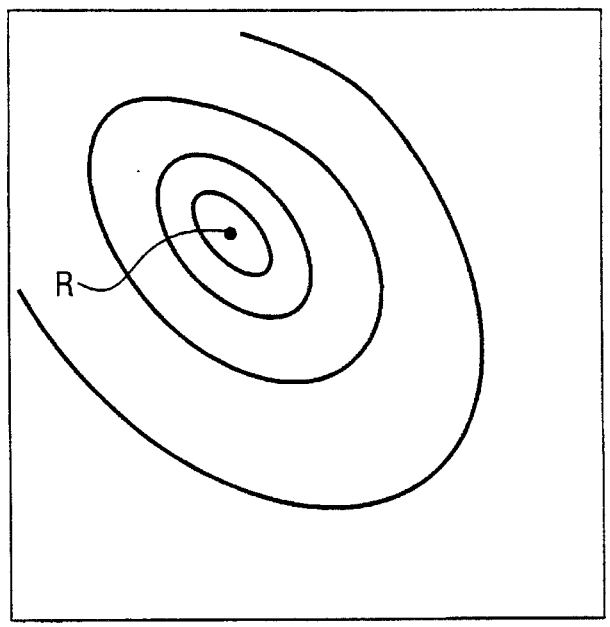
FIG. 6 is a schematic representation of a Glass pattern which is formed when a reference image is superimposed upon a transformed version of itself, the transformation similar to that of FIG. 5, but also including a rotation, according to the present invention.

The variety of Glass pattern illustrated schematically in FIG. 6 is elliptical in nature. This variety of Glass pattern, similar to that of FIG. 5, has a reference point known as a saddle point. The reference point is positioned at the midpoint of a line segment connecting the two foci of the ellipses. This variety of Glass pattern is produced in a manner similar to that described above for FIG. 5, but the superimposed image is also rotated relative to the reference image.

Figure 7:
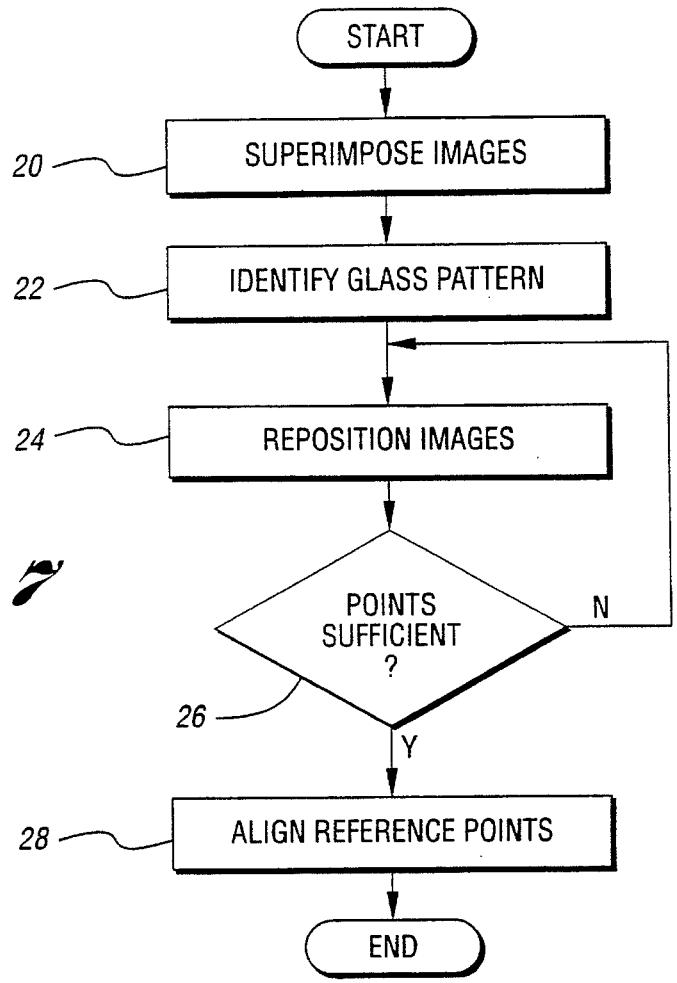
FIG. 7 is a flow chart illustrating a general method for image alignment using Glass patterns according to the present invention.

Referring now to FIG. 7, a flow chart is shown to illustrate the general method for image alignment using Glass patterns according to the present invention. At Step 20, the images to be aligned are superimposed. The mechanics of superimposing two images depends on the type of images being superimposed. For example, consider the task of superimposing a traditional 2D image, such as the image in FIG. 1, with a rotated and translated version of that image. It is assumed, of course, that the reference image and the image to be aligned have been captured and stored in some fashion which facilitates repositioning of one image relative to the other.

The superimposition could be as simple as creating a transparency of the rotated version and placing it on top of the reference image. Of course, automated superimposition of traditional images is easily performed by a digital computer as well. Image capturing equipment, such as a scanner or a video camera, is readily available. One common method is to represent each image as a fine grid of picture elements (pixels), with each pixel having a grayscale value from 0 to 255, with zero representing white and 255 representing black. Superimposing the two images, then, may be accomplished by assigning a convenient coordinate system to each image and performing a mathematical or logical operation on corresponding pixels. The mathematical or logical operation may be used to generate a third image which represents the superimposition of the first two images. Thus, if the mathematical operation was simply addition, each pixel in the third image would have grayscale values ranging from 0 to 510. To keep values in the range from 0 to 255, the computed values may be divided in half, or a maximum of the two values used instead of a sum. Although it may be difficult to visualize what these combined values represent, this third image can then be utilized by the computer in the subsequent steps of the method as described below.

Alternatively, the superimposition may consist of comparing the grayscale value of a point in the reference image with the grayscale value of a point in the image to be aligned. In this case, a third image is not actually generated. The computer simply works with each image data set separately. This type of superimposition is preferably used for generalized multi-dimensional images. For generalized images, each image is represented as a multi-dimensional array in the computer memory. Superimposing two images, then, involves performing some operation on each corresponding element in the images.

Figure 8A:
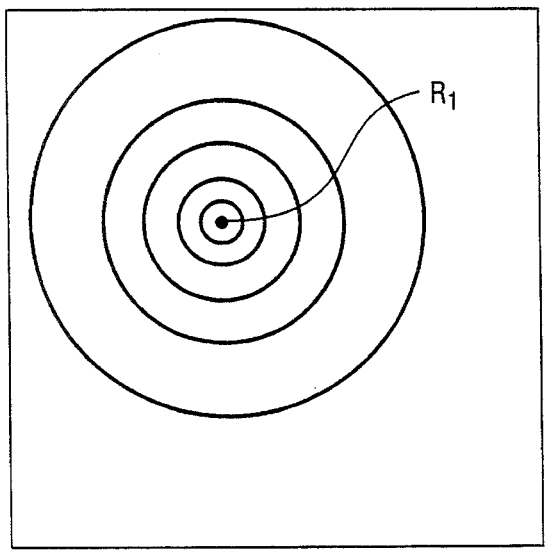
FIGS. 8a and 8b schematically illustrate typical Glass pattern reference points used in the method of FIG. 7 to align images according to the present invention.

Still referring to FIG. 7, Step 20 includes superimposing the images so as to produce a Glass pattern having a determinable reference point in each of the two images, such as the Glass pattern illustrated schematically in FIG. 8a. Thus, a Glass pattern may be produced by the first superimposition, or this step may require iteratively moving the images relative to each other until a determinable Glass pattern is produced. Once a Glass pattern with a determinable reference point is formed, Step 22 characterizes the Glass pattern as one of those illustrated in FIGS. 2 through 6.

Any of a number of methods and implementations may be utilized to detect a Glass pattern and its associated reference point. One such implementation utilizing a neural network is described by Stephen Grossberg and Ennio Mingolla in "Neural dynamics of perceptual grouping: Textures, boundaries, and emergent segmentations", *Perception and Psychophysics*, 38:141–171 (1985). Other methods of the present invention for locating Glass patterns and their reference points are illustrated and described in greater detail below.

By associating the Glass pattern with a particular Glass pattern group (such as concentric circles, ellipses, etc.), the nature of the transformation between the images to be aligned may be identified so as to determine the minimum number of independent reference points required to uniquely define the proper image transformation. Since the Glass pattern formed is a function of the underlying relationship between the images to be aligned, the number of reference points required to determine that relationship is a function of the group of Glass pattern produced. Of course, more than the minimum number of reference points may be used to increase the confidence level of the image alignment. The optimal number of reference points depends on a wide group of factors in capturing, sampling, and manipulating the images. Therefore, the optimal number of reference points is best determined empirically.

Figure 8B:
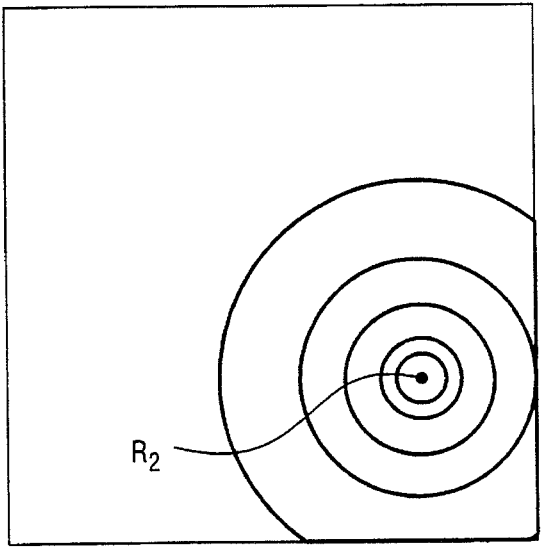

With continuing reference to FIG. 7, Step 24 includes repositioning at least one of the images so as to produce a subsequent Glass pattern having a determinable reference point. The subsequent reference point must be independent of the first reference point. The subsequent Glass patterns should be of the same group as the previously generated Glass patterns, as is illustrated schematically in FIG. 8b. If a different group of Glass pattern is formed, this indicates a local variation within the images and the images should be repositioned until a Glass pattern of the same group is produced.

For example, consider two images of a rotating object captured by a stationary camera. The rotating object represents a local variation among the two images. Misalignment of the rotating object may produce one group of Glass pattern while misalignment of the background may produce a different group of Glass pattern. Therefore, it is necessary to select reference points within the same group of Glass pattern for proper alignment. Thus, a reference point of a Glass pattern produced by misalignment of the background regions should not be used in conjunction with a reference point of a Glass pattern produced by misalignment of the rotating object.

Since the reference point of a Glass pattern moves predictably as the images are repositioned, the location of subsequent reference points can be predicted. Therefore, when a local variation is detected, the subsequent reference points may be chosen near the first reference point and shifted until the group of Glass pattern changes. This maximizes the distance between the reference points while assuring that they are within the same group of Glass pattern so as to increase the accuracy of the alignment.

As also shown in FIG. 7, at Step 26, if more reference points are needed to determine a unique transformation due to the group of Glass pattern produced, the method repeats Step 24 to locate subsequent reference points. Once a sufficient number of reference points are identified, the method continues at Step 28. The reference points which have been identified are simultaneously aligned at Step 28 so as to align the images.

To further demonstrate the simple, yet powerful, nature of the method described in FIG. 7, consider the task of aligning an image reproduced on translucent media, such as a typical transparency, which has simply been rotated and translated relative to the original image. A Glass pattern such as the pattern illustrated in FIGS. 2a and 2b will be produced. Conceptually, this method involves passing a needle and thread through the transparency and its original at the reference point of the Glass pattern such that there is some slack in the thread. Repositioning the transparency relative to its original will produce a similar Glass pattern having a different reference point. Fixing the second reference point by inserting a tack through that point will make it a center of rotation. Finally, simultaneously aligning the reference points by pulling the thread taut will align the transparency with its original. The quality of the alignment may be judged by the distance between the threaded holes when the thread is taut (if the translucent media is rigid). For flexible media, alignment quality is indicated by the amount of stretching or buckling of the media when the holes are aligned.

Figure 9:
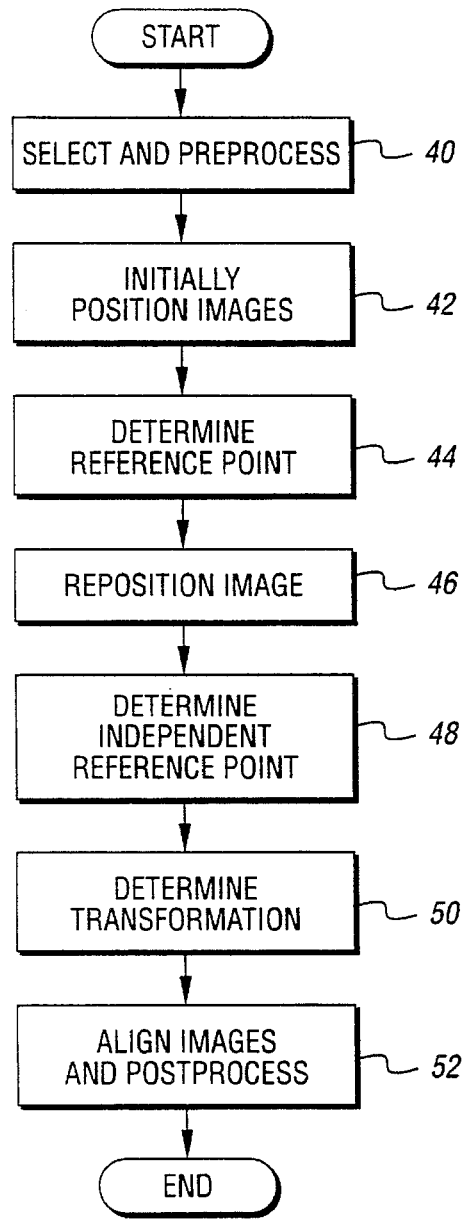
FIG. 9 is a flow chart illustrating one embodiment of the general method illustrated in FIG. 7 particularly useful for aligning an image which has been translated and rotated according to the present invention.

Referring now to FIG. 9, a flow chart is shown which illustrates one embodiment of the general method illustrated in FIG. 7 which is particularly useful for aligning a reference image with an image which has been translated and rotated. Step 40 includes selecting the images to be aligned and performing any preprocessing operations on the image data. Desirable preprocessing operations depend upon the type and content of the images to be aligned.

For example, for certain images, there may be some benefit in adjusting the contrast or color scale of each image to be aligned. To assure that the superposition of the images is not over saturated, and therefore truncated, each pixel in each image may be adjusted so that it is no more than half-saturated. In an automated system on a computer, this would correspond to ensuring that each pixel value in the superposition was the sum of the corresponding image values in each of the two images being superimposed, as previously discussed.

Another preprocessing step which may enhance the speed and accuracy of the alignment process according to the present invention is sparsification. This process includes various techniques used to make a fully continuous image less dense, or more sparse. Thus, it involves manipulating the image, or image data, to reduce or eliminate spurious noise as well as features which are not necessary for alignment. The normal computer-based digital image has already undergone such a process since a continuous real-world scene has been captured by applying a rectangular sampling grid and producing a checkerboard pattern of pixels.

A more extreme case of sparsification may be illustrated by a typical newspaper photograph which implements half-toning. This process involves reducing a grayscale image to black and white pixels of various sizes, shapes, and spacings so that, when seen from a distance, the original image is replicated, although printed in black ink.

For the system and method of aligning images using Glass patterns according to this invention, the normal sampling process of reducing a continuous image to pixels is usually adequate to produce a determinable Glass pattern. Only in rare cases is half-toning necessary to make the Glass patterns determinable. However, it may be desirable to induce a transformation into the image to be aligned to facilitate the formation of a particular Glass pattern thereby enhancing the alignment process. For example, the image to be aligned may be intentionally scaled to produce a starburst type of Glass pattern.

Returning now to FIG. 9, after the images to be aligned have been selected and preprocessing is completed, initial positioning of the images is performed at Step 42. This step includes superimposing the images and positioning the images so that a Glass pattern with a determinable reference point is produced. Thus, it may involve incrementally moving one image, relative to the other image, until the reference point is determinable by Step 44.

An important feature of this invention is that it is not necessary for the reference point to initially be located within the images being aligned. For example, since it is known that a translation and rotation transformation produces a bull's-eye interference pattern, only a portion of that pattern needs to be determined for a successful alignment. Once the pattern is determined with the reference point outside of the images, it may be preferable to continue positioning the images to shift the reference point so that it is within the images.

Still referring to FIG. 9, once a Glass pattern suitable for determination of a reference point has been identified, a coordinate system is defined in each of the images to be aligned at Step 44 so as to locate the reference point within each respective coordinate system. The coordinate system chosen is arbitrary, although certain images would typically fit certain coordinate systems. For example, a cartesian coordinate system would typically be used for a traditional 2D picture. The origin of the coordinate system chosen is arbitrary as well. Typically, however, a "corner" of the image is taken as the origin.

For the purpose of illustration, the reference image to be aligned may be designated as the bottom image, or image B, while the transformed image to be aligned is designated as the top image or image A. Assume the images are 2D and that a cartesian coordinate system is assigned to each image. The reference point of the first bull's-eye Glass pattern identified may then be designated as $R_1$ having the coordinates $(X_{A1},Y_{A1})$ in image A and $(X_{B1},Y_{B1})$ in image B. Thus, one point in image A and a corresponding point in image B have been located.

As also shown in FIG. 9, Step 46 includes repositioning at least one of the images to be aligned to determine a different reference point. This step may include translating at least one of the images so as to produce a second bull's-eye pattern having a determinable reference point in each of the two images. The second reference point must be different from the first reference point. In choosing the second reference point, improved alignment accuracy is obtained by increasing the distance between the two reference points. Thus, if convenient, reference points located near opposite "corners" of the images could be chosen to maximize the "baseline".

In Step 48, the second reference point is located in the coordinate systems assigned to each of the images. For the purpose of this illustration, the second reference may be designated as $R_2$ and given the coordinates $(X_{A2},Y_{A2})$ in image A and $(X_{B2},Y_{B2})$ in image B. Sufficient information to determine the transformation needed to align the images has now been obtained.

Step 50, then, determines the transformation parameters which relate each point in image A to a corresponding point in image B. These parameters are determined by solving a set of simultaneous equations which characterize the relationship between the reference points in image A and the corresponding reference points in image B. This is the analogue to the tack and thread example previously described. Thus, to determine the transformation, it is necessary to determine the translation between R1 and R2 and the rotation of image A about R2. Note that in the cartesian coordinate system chosen, the translation may have an abscissa and an ordinate component. Therefore, there are three (3) unknowns but four (4) equations. Thus, solving the following sets of simultaneous equations will uniquely determine the unknown parameters:

$$X_{B_1}=X_{A_1}+X_{Trans}+R_{B_1}\sin(\theta)$$
$$X_{B_2}=X_{A_2}+X_{Trans}+R_{B_2}\sin(\theta)$$
$$Y_{B_1}=Y_{A_1}+Y_{Trans}+R_{B_1}\cos(\theta)$$
$$Y_{B_2}=Y_{A_2}+Y_{Trans}+R_{B_2}\cos(\theta)$$

(1)

where $X_{Trans}$ is the abscissa component of the translation, $Y_{Trans}$ is the ordinate component of the translation, $\theta$ is the angle of rotation, $R_{B1}$ represents the radial distance from the center, $C_B$, of image B to reference point $R_1$, and $R_{B2}$ represents the radial distance from $C_B$ to reference point $R_2$, given by:

$$R_{B_1} = \sqrt{(X_{B_1} - X10)^2 + (Y_{B_1} - Y_0)^2}$$
$$R_{B_2} = \sqrt{(X_{B_2} - X_0)^2 + (Y_{B_2} - Y_0)^2}$$

(2)

where the coordinates of $C_B$ are $(X_0,Y_0)$.

Any of a number of commercially available computer software packages may be used to solve these simultaneous equations to determine the translation and rotation transformation. In this particularly common and simple case used for illustration, a closed-form solution is possible. For other, more complex transformations, numerical methods may be used to determine the transformation parameters.

As further shown in FIG. 9, once the transformation parameters have been determined so as to uniquely determine a transformation between the images, the images are brought into alignment by Step 52. Once aligned, postprocessing operations may be performed which may include feature detection, edge enhancement, filtering, and measuring objects within the images, among other image processing operations.

Figure 10:
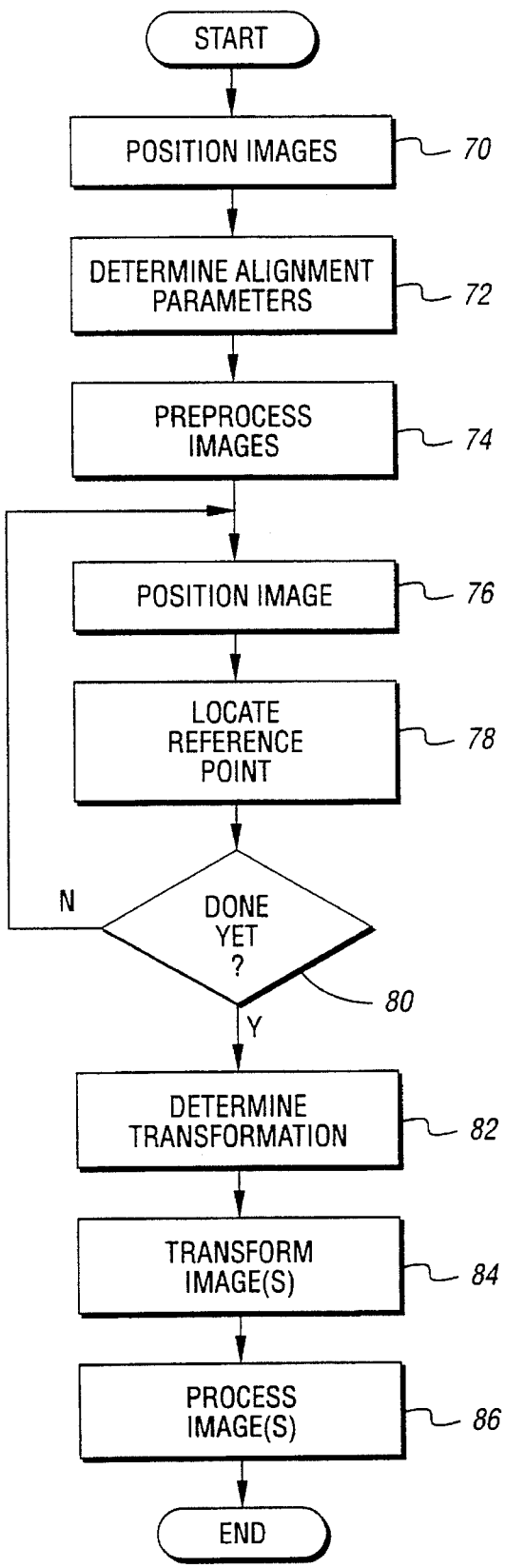
FIG. 10 is a flow chart illustrating another embodiment of the general method illustrated in FIG. 7 particularly useful for aligning images related by a complex global transformation according to the present invention.

Referring now to FIG. 10, a flow chart illustrating another embodiment of the general method illustrated in FIG. 7 is shown. The method illustrated by the flow chart of FIG. 10 is particularly useful for aligning images related by a complex global transformation. The method begins at Step 70 with selecting the images to be aligned. Step 72 determines the alignment parameters, such as the number of reference points to be utilized, or the type of preprocessing to employ for efficient alignment of the images. This step depends heavily on the particular underlying application of the alignment process. As before, the minimum number of independent reference points required is determined by the nature and complexity of the transformation between the images. However, the actual number of reference points which are used to align the images is influenced by a wide variety of factors as discussed below.

Alignment Factors

The dimensionality of the domain, which corresponds to what is typically referred to as the dimensionality of the images, is one factor which influences the alignment parameters, especially the number of reference points which are utilized in the alignment process. As a general rule, an image of higher dimensionality will require a greater number of reference points for proper alignment. The dimensionality of the range also influences this choice, and is related to the representation chosen in capturing the image. For example, a grayscale representation of an image is single dimensional, while an RGB color representation would be three-dimensional.

Still another consideration concerns the agent performing the alignment process, that is, whether the process is automated and performed entirely by a computer, manual and performed solely by an experienced person, or a combination performed by a coordinated effort of both human and machine. For example, it is within the contemplation of this invention to use interactive alignment software which utilizes an operator to manipulate the images to be aligned or to manipulate the physical or intangible process which is represented by the images. An operator may also provide assistance in recognizing various Glass patterns. The computer would then compute the necessary transformation parameters, align the images, and perform any other image processing tasks required.

The number of images to be aligned and the relationship between the images may be considered in choosing the alignment parameters, such as the number of reference points. For example, aligning successive frames of a motion picture may require fewer reference points than aligning two images with an unknown relationship. Prior alignment experience may greatly improve the speed of such a process since the alignment of a subsequent frame can often be closely predicted based on the content of the previous frame. Processing time constraints are especially important in real-time control applications of image alignment. Potential real-time control applications may include such diverse tasks as robotic animation control, or adjusting the course of a moving vehicle.

The method in which the images were captured and stored influences the alignment parameters as well. For example a digitized image captured with a charge-coupled device (CCD) array may suggest different parameters than an image captured with a photographic emulsion, such as that used in many types of film. Similarly, the type of images should be considered such as whether one or both are PET scans, CT scans, or multi-spectral alignments, as well as the type of sensor utilized, such as sonar, radar, optical ultrasound, or otherwise. Knowledge about the type and level of noise present in each of the images may also be used to select alignment parameters. The precision and confidence level of the alignment, as required by the user, are still further considerations. Aspects of the image content such as texture, range, focus, granularity, and distinctiveness of features are also considerations. Knowledge of the similarity of the images to be aligned aids in the alignment process as well, such as whether one image is a subset of the other, whether they should be identical or similar, a time-series representation, or have no known a priori relationship.

A still further consideration affecting selection of the alignment parameters includes the purpose of the alignment. Some applications may require returning a number of close matches, known as best match applications, whereas others may have a number of matches for a particular image and are known as any match applications. For example, consider fingerprint matching which may require a single best-match to a reference whereas automated speech processing and recognition may match a particular phoneme with a large number of syllables, words, and phrases.

As with other image alignment techniques, some measure of quality of the result can be obtained and used for feedback, or as a stopping condition for an iterative process of converging on an improved alignment transformation. In general, knowledge of the particular problem domain and the purpose of alignment will affect the techniques employed for determining when the alignment is sufficient. It is generally desired to reduce noise and deformation in the images to be aligned while retaining actual motion of objects. This may require some domain specific knowledge acquired empirically. For most real images, the decomposition of a transformation into a sum of a global portion and a local portion is not unique, i.e., a number of global-local transformation decompositions are possible for a particular image pair. The appropriate combinations of decomposition components may then be chosen. This choice depends upon the purpose of the alignment as mentioned above. Some applications may focus on the global component, while other applications focus on the local component. Furthermore, a particular global transformation which meets global quality parameters may be identified before proceeding with a more detailed, localized search for Glass patterns in those regions where the quality or nature of the local transformations do not satisfy the desired local quality parameters. Local, non-uniform distortions are thereby accommodated.

Alternatively, each cycle of iterations could increase the density of points matched in regions having large distortions, while using only sparse matching points (to save processing time) in regions of the images having little or no distortions. For example, a transformation corresponding to a triangle of matching points could be applied to a center point of the triangle to see if that transformation would describe the midpoint in addition to the peripheral points. If the transformation is unacceptable, the triangle could be divided into three smaller triangles and the process repeated for each of the smaller triangles to isolate local distortions and their corresponding transformations.

For many reasons, including movement of an object which reveals a previously hidden object, there may be regions of the two images which cannot be matched, despite the fact that other regions of the images meet the desired local and/or global quality parameters. If the transformations between images are smoothly varying over the image, it can be determined what transformations are likely to move any desired point on one image onto its corresponding point in the other image. Such a shift of the images may then be utilized to anticipate the location of a subsequent Glass pattern.

Thus, it is possible to probe for an expected alignment and evaluate the local or global quality of that alignment for various regions and expected reference points within the images. A confidence factor may be determined which indicates that one point in one image has a corresponding matching point in the other image based on the quality of the Glass pattern detected. The quality of the Glass pattern is determined not only around that point, but also for patterns resulting from nearby reference points as well. If all the points in a region result in clearly distinguishable Glass patterns, and if the patterns move in an expected fashion as the images are translated relative to one another, the confidence of the alignment is increased. By using such probes to explore outside of regions in which no Glass pattern is detected, the approximate size and shape of the anomaly can be determined. Thus, the present invention determines areas which match, as well as regions which do not match. The fact that a particular region, or an entire image, does not match with another region/image is valuable information in itself since, for some applications, it is desirable to determine that the images being considered are dissimilar.

An important application utilizing Glass patterns as local quality measures combines multiple images, not by averaging, but by composing a mosaic from the various "well-matched" sub-regions of the images. Thus, each sub-region of the mosaic is transferred from various sub-regions in the images for which the measured quality (determined by the Glass pattern confidence and stability) is the highest. This would be useful for analyzing images captured through shimmering air or water, or for images with location variable noise, since it provides another means for determining when a sub-region match is quiescent, or valuable. The mosaic then represents a time-lapse, undistorted image since it is composed of various sub-regions which are free of distortions at various times. The mosaic image may then be compared with a reference image to detect changes. For example, a reference image of a distant building, or a sonar map of the sea-floor, could be scaled by a factor of 1.05 (to produce a Glass pattern when superimposed) and used for examining the same area under less optimal conditions. When the Glass pattern revealed a clear star-burst shape (which, statistically, it would from time to time) corresponding to instantaneously optimal viewing conditions, that image would be selected and stored. It could then be subtracted from the reference image to reveal changes, or otherwise processed as desired.

If a reference image captured under optimal conditions is not available, dynamic comparison of successive images could be utilized. This would reveal relationships among a number of related points in a particular sub-region which experience similar movement or distortion from one image to the next. By monitoring sub-regions over a period of time, the movement or distortion may be eliminated.

Returning now to FIG. 10, Step 74 includes preprocessing of the image data. The preprocessing step includes any of the preprocessing operations discussed above, such as sparsification and noise filtering. Selecting the alignment parameters includes a determination of the types of preprocessing operations which are likely to enhance the alignment process. Step 74, then, manipulates the images, or their data representations, in preparation for further processing by the image alignment method according to the present invention.

As also shown in FIG. 10, Steps 76, 78, and 80 are performed iteratively a predetermined number of times as determined during the selection of the alignment parameters in Step 72. Step 76 includes positioning the images so that a Glass pattern having a determinable reference point is formed. As before, this may include physically moving either one of the images, or both of the images as well as mathematically manipulating the image data for either one of the images, or both of the images. Step 78 determines the reference point and locates it within the image coordinate systems before storing those locations for later determination of the transformation parameters. Step 80 determines if a sufficient number of reference points have been identified. If more reference points are needed as determined by the alignment parameters, processing continues with Step 76, otherwise, if a sufficient number have been located, processing continues with Step 82.

Still referring to FIG. 10, Step 82 determines the transformation to align the images. Similar to the general method for aligning images described above, any of a number of commercially available software packages may be used to solve the set of simultaneous equations generated by the plurality of reference points. Typically, for a complex, general transformation, numerical methods must be used since a closed form solution is unavailable, or much more difficult to compute. Alternatively, specialized hardware may be designed to further improve the processing speed. It is desirable to implement many image processing methods, such as the image alignment method of this invention, on parallel processing architectures due to the order of magnitude increase in processing speed.

With continuing reference to FIG. 10, Step 84 performs the actual image transformation necessary to align the images utilizing the transformation determined in Step 82. Once the images have been aligned, Step 86 includes various other application specific image processing operations. As before, these may include feature detection and analysis, edge detection, filtering, averaging, measuring, or other such operations.

Figures 11A, 11B:
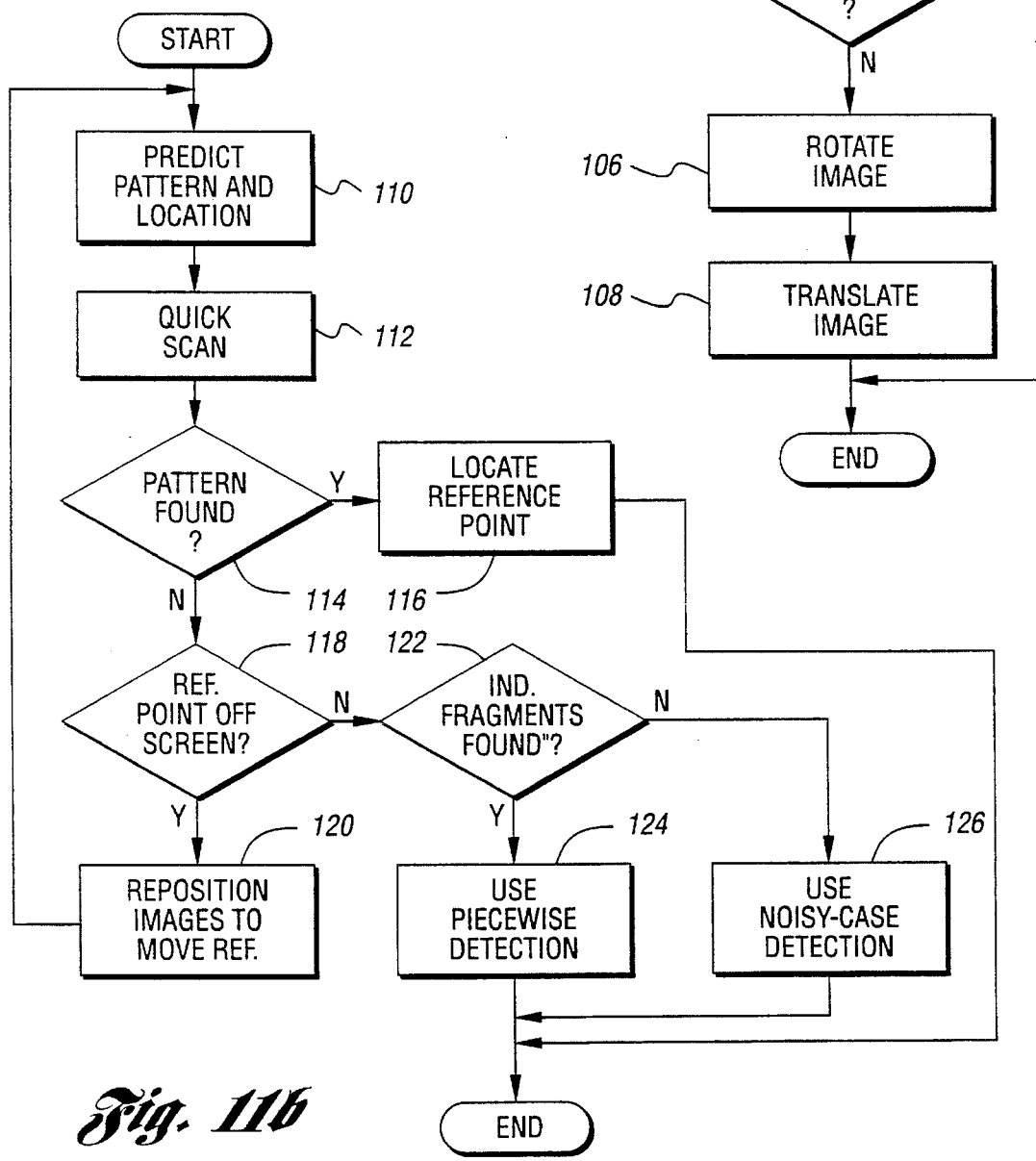
FIGS. 11a and 11b are flow charts which further illustrate the steps of the method of FIG. 10 including positioning the images and locating reference points according to the present invention.

Referring now to FIGS. 11a and 11b, the flow charts shown illustrate a method of implementing the positioning Step 76, and the step of locating reference points 78, as shown in FIG. 10. FIG. 11a illustrates a method of positioning the images to be aligned. Step 100 includes reviewing the alignment parameters, which are influenced by a number of considerations as discussed above, to estimate a superposition which will align the images.

Step 100 of FIG. 11a also includes a review of the recent history of matches and alignments to identify any patterns or trends which may be emerging. In many applications, such as motion picture analysis, knowledge of the content of the previous frame will provide valuable information in aligning subsequent frames as to orientation, moving objects, noise level, etc. Utilizing additional knowledge may facilitate the alignment or analysis process so as to increase its efficiency. For example, the confidence level of a posited match would increase if the corresponding pixels in question were of same color, intensity, or had other similar attributes. Examining recent alignment history is also useful in medical imaging applications which often utilize a series of related 2D, cross-sectional images to reconstruct a 3D structure. Variations in these types of series can often be predicted so as to further facilitate the alignment process.

With continuing reference to FIG. 11a, Step 102 uses the information gleaned from Step 100 to establish an initial positioning of the images to be aligned. Step 104 checks to see if the initial positioning has indeed made a detectable Glass pattern. If so, the method continues with the post-processing Step 86 of FIG. 10. If the result of Step 104 is false, processing continues with Step 106.

Still referring to FIG. 11a, Step 106 performs a rotation on the image to be aligned. Preferably, the rotation will be between about 4° and 12° depending on the recent history information obtained by Step 100. If no recent history information is available, a default rotation of 8° is performed. Step 108 performs a translation on the image to be aligned. Preferably, recent history information will be utilized to determine the magnitude and direction of the translation. If no historical information is available, a default translation of approximately 5% of the image width is performed. The method then continues with Step 110 as illustrated in FIG. 11b.

Referring now to FIG. 11b, the flow chart shown illustrates a method for locating reference points according to the present invention. Step 110 utilizes the alignment parameters in conjunction with the recent alignment history to predict the type of Glass pattern and a likely location for its reference point. If no recent history is available, the center of the images becomes the starting point. Step 112 performs a preliminary "quick scan" which will look for a single well-defined Glass pattern determined with a particular confidence level. Step 114 determines if a recognizable Glass pattern has been identified and determines the confidence level of that identification. If the confidence level meets or exceeds that specified by the alignment parameters, processing continues with Step 116. Step 116 locates the reference point of the Glass pattern within the coordinate systems of the images. The method then continues with Step 82 of FIG. 10.

Referring again to FIG. 11b, if a single, distinctive Glass pattern is not identified with a sufficient confidence level, the method continues with Step 118. At Step 118, the images are analyzed to determine if a portion of a Glass pattern has been determined which has its reference point outside of the images. If this is the case, Step 120 adjusts the positioning of the images relative to each other in an attempt to move the reference point to a point within the images. This step may be performed automatically by the computer, or interactively with operator assistance. The method then returns to Step 110 to determine if the repositioning was successful and to continue the reference point determination.

Still referring to FIG. 11b, if Step 118 does not identify a portion of a single Glass pattern, the method continues with Step 122. This step attempts to determine if multiple Glass patterns are present by locating multiple independent fragments of various Glass patterns. This condition would exist if there were local variations between the images being aligned, such as images of moving objects captured with a moving camera. If multiple independent fragments of Glass patterns are determined at Step 122, the method continues with Step 124, otherwise, processing continues with Step 126. Step 124, then, utilizes any of a number of known stereographic analysis methods to segment the image into regions each having one of the various types of Glass patterns.

For example, in a series of images captured by a moving camera, or having moving objects or regions, or both, the camera has effectively moved from a "left-eye" position to a "right-eye" position between two subsequent images to be aligned. A particular unobstructed object within the images will correspond to a contiguous region which moves coherently, but perhaps in a different way than the rest of the images. The distance that this portion of the images has moved depends on the distance from the object to the camera. Alignment may be difficult if each object in the images has a different apparent motion. However, in many cases, all distant objects can be considered as a single "background" object. Other objects then appear to move in front of that background. In this case, each object has to be treated separately for alignment purposes. Depending on the particular application, it may be desirable to align the objects within the images, or to align the background of the images. Detection of moving objects can be useful in determining the number of separate objects, the approximate boundaries of each object, and what transformation corresponds to the apparent motion of the objects between the images.

Where multiple objects could possibly correspond between two images, the quality of the Glass pattern and the reasonableness of the corresponding transformation provides important information in identifying which region in image A corresponds to which region in image B.

Returning now to FIG. 11b, Step 126 assumes that no Glass pattern has been detected with a sufficient confidence level indicating there may be significant noise in the images to be aligned. Thus, Step 126 utilizes detection routines adapted to eliminate various types of noise, again, depending upon the recent alignment history, before continuing at Step 82, illustrated in FIG. 10.

For example, in the case of typical noise in images (such as the "salt and pepper" saturation, or loss of pixels from a CCD camera resulting in white and black pixels scattered across the images in a random fashion), the ability to accurately align images can allow several slowly varying images to be averaged together with confidence. This increases the signal to noise ratio (SNR) and improves the quality of the image. Similarly, if a slowly varying low-frequency distortion of the images is present (as when viewing a distant scene through heated air), the ability of the present invention to find corresponding points and align regions within the images allows for increased SNR, as well.

If distortion between successive images is sufficient so that a Glass pattern is not detected, it may still be possible to align the images through curve-fitting techniques. These techniques would be utilized to extrapolate the transformations used in the recent alignment history to produce a posited transformation which is applied to one of the images. The transformed image is then utilized to attempt to produce a Glass pattern. If successful, the final transformation will be a combination of the extrapolated transformation and the transformation produced by the subsequent alignment of Glass pattern reference points.

This provides a method of pretransforming the images which may be useful before the actual alignment process is performed. One of ordinary skill in the art should appreciate that it would also be possible to use successive approximations as a variant of this technique to approach the actual transformation in a multi-step process.

Multiple Image Sequence

Figure 12A:
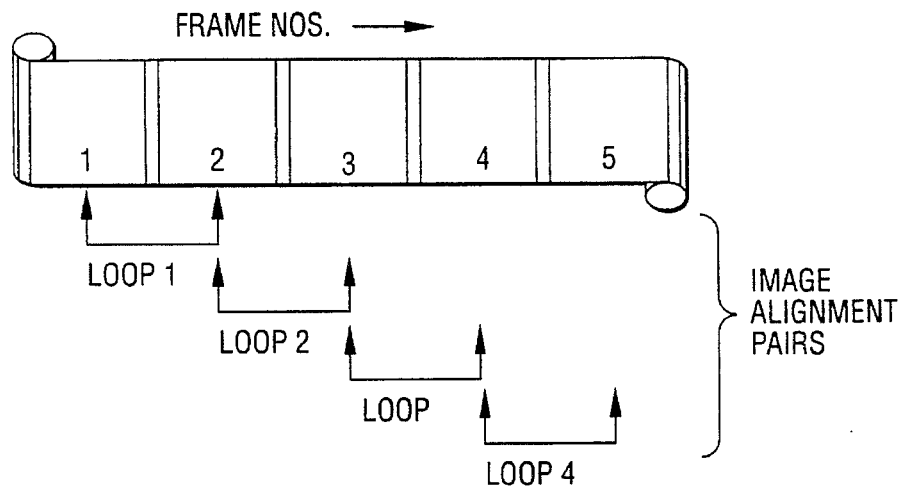
FIG. 12a is a schematic representation of a multiple image sequence for processing according to the method for aligning images of the present invention.

FIG. 12a is a schematic representation of a multiple image sequence to be used with the image alignment method of the present invention. Some common applications which routinely utilize multiple image sequences include motion picture processing and medical imaging. Typically, the multiple images are closely related so that there is little variation between successive images. Thus, these applications are particularly suited to utilization of recent alignment history as described above. The flow chart shown in FIG. 12b illustrates a method for aligning the images of a multiple image sequence utilizing the method of image alignment according to the present invention.

Figure 12B:
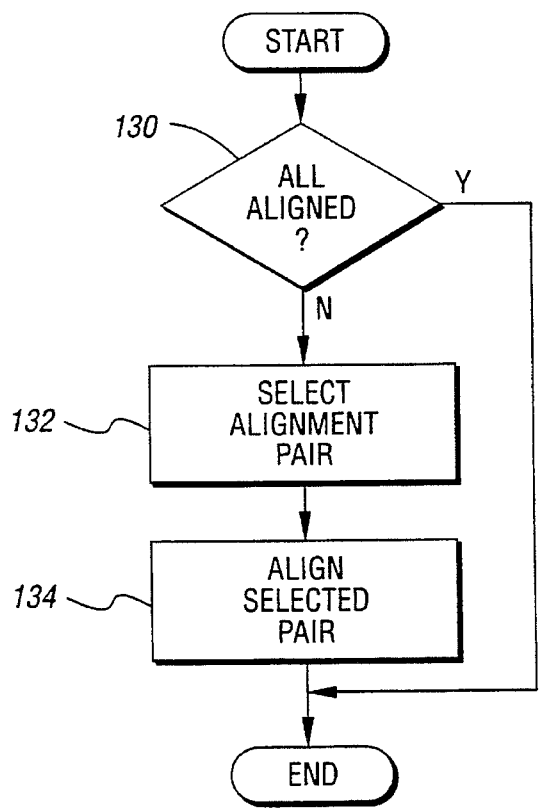
FIG. 12b is a flow chart illustrating another embodiment of the general method illustrated in FIG. 7 particularly useful for aligning a multiple image sequence according to the present invention.

As shown in FIG. 12b, Step 130 includes a test to determine if all images have been processed. If the test result is affirmative, the process is complete and terminates. Otherwise, the process continues with Step 132 which selects the images to be aligned. On the first loop, Step 132 selects the first two (2) images of the sequence. On subsequent loops, Step 132 selects the next image of the sequence and attempts to align it with the previous image. Step 134 incorporates the steps previously described and illustrated in FIGS. 7 through 11 to select alignment parameters, identify Glass patterns, locate reference points, align the selected images and perform desired post-processing. The process then repeats beginning with Step 130 until all the images in the sequence have been processed.

Figure 13A:
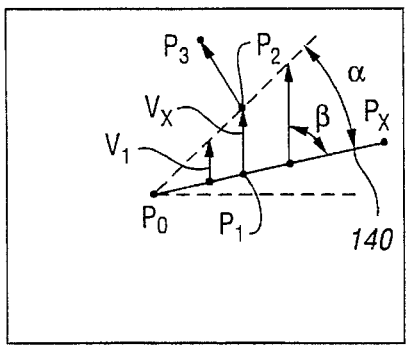
FIGS. 13a through 13f illustrate a method for locating reference points of Glass patterns using trajectories according to the present invention.

Referring now to FIGS. 13a through 13f, an alternative method for identifying Glass patterns and locating their corresponding reference points is illustrated. FIG. 13a is a mathematical construct having a rotating arm 140 extending between points $P_0$ and $P_x$. Arm 140 represents the tail of a plurality of vectors $V_1$ through $V_n$, such as vector Vx which extends from point $P_1$ to point $P_2$, at some angle β, relative to arm 140. As arm 140 is rotated through an angle α, the vectors define a variety of corresponding trajectories, such as the trajectory from $P_1$ to $P_2$ defined by vector $V_x$.

Figure 13B:
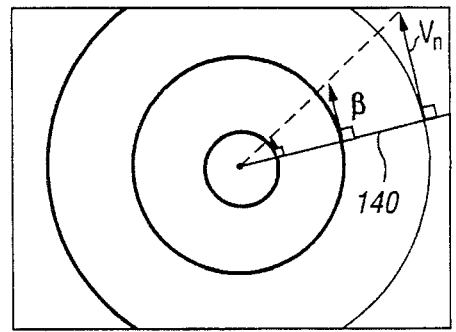
Figure 13C:
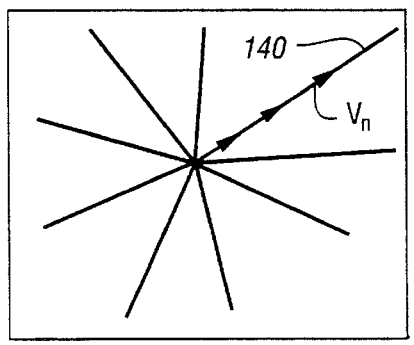
Figure 13D:
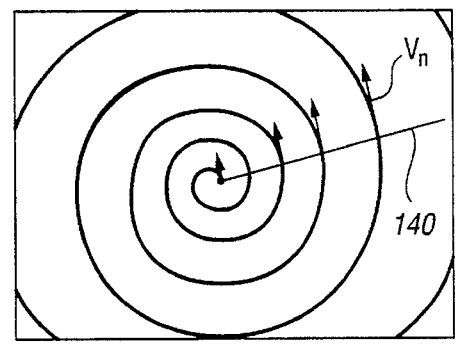

If β=90° as illustrated in FIG. 13*b*, this procedure would generate concentric circles. If β=0° as illustrated in FIG. 13*c*, this procedure generates a star-burst pattern. If β has a value between 0° and 90°, a spiral pattern is generated as shown in FIG. 13*d*. This construct illustrates that, for radially symmetric shapes, displacement vectors of the same length lie in an annulus centered about a center of rotation. The distance from the center of rotation to each of these displacement vectors is a constant which increases for increasing lengths of the displacements. This principle is similar to that of the displacement of a wave generated by a point source. A wave starting at $P_0$ reaches all points of a particular annulus, such as that shown in FIG. 13*e*, simultaneously. Similarly, if each of the points on that annulus is a point source generating its own waves, those waves would all reach the center of rotation, $P_0$, simultaneously.

Such a simulated wave, having energy that is attenuated as a function of time and distance, would peak briefly and sharply at the center of the annulus as the waves from each vector passed that center point simultaneously. Thus, if the only displacement vectors considered were similar to those illustrated in FIG. 13*e*, each simultaneously becoming a point source, a computation or measurement over time of the instantaneous maximum energy density at each point in space would reveal the center of the annulus in space (since the individual waves would combine to produce a maximum total wave energy at that point).

Figure 13E:
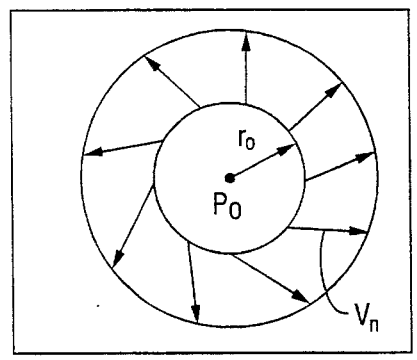
Figure 13F:
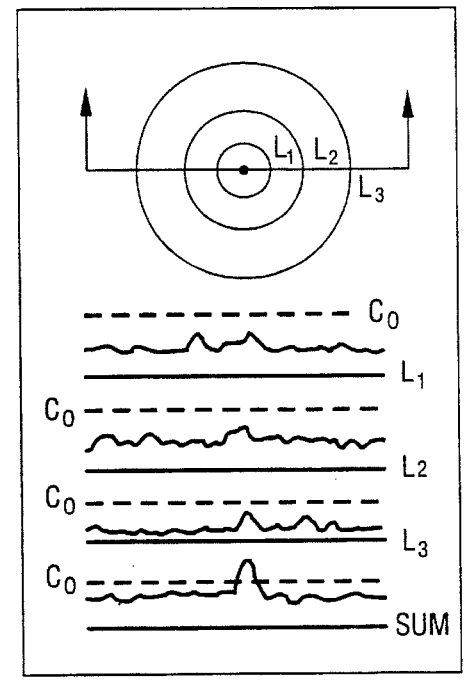

In an actual image, however, vectors of length $L_0$ as illustrated in FIG. 13*e* would be embedded within an image containing other vectors of the same length which are scattered across the image. Thus, a center of rotation as indicated by the peak location of these vectors will likely be below a predetermined confidence level $C_0$. FIG. 13*f* illustrates a cross-sectional view of peak energy for vectors of length $L_1$, $L_2$, and $L_3$, along with a predetermined confidence level $C_0$. For random or uniform distributions, each group of vectors having length $L_x$ may have peaks indicating different centers of rotation. However, each group will also have a component indicating the true center of rotation. By combining the contributions of a number of vector groups, the true center of rotation will emerge above the confidence level C0, while spurious indications of the center of rotation will cancel one another.

Since this method of identifying the circular, star-burst, or spiral Glass patterns can be parameterized, it is also amenable to the use of Hough transforms. As is known, Hough transforms are computationally expensive to employ. However, many accelerated and parallelized versions of the Hough transform are available.

Figure 14A:
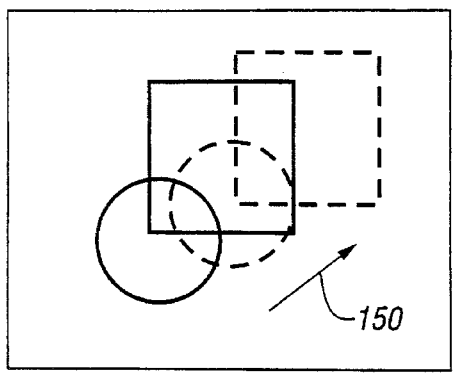
FIGS. 14a through 14g illustrate another method for locating reference points of Glass patterns using Fourier transforms according to the present invention.
Figure 14B:
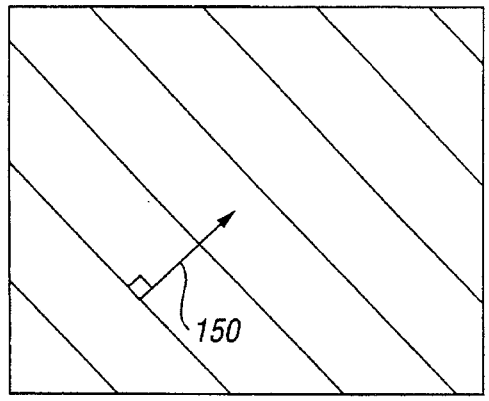

Referring now to FIGS. 14*a* through 14*g*, another method for locating Glass patterns and their corresponding reference points is illustrated. FIG. 14*a* shows two images which have been superimposed. The first image is represented by solid lines. For clarity of illustration only, the second image is represented by broken lines. The second image has been translated in the direction of arrow 150 relative to the first image. Computing the Fourier transform of the superimposed image of FIG. 14*a* generates a pattern with a component such as that shown in FIG. 14*b*. The Fourier transform (or an approximation) may be computed in a variety of ways, such as utilizing the well known Fast Fourier Transform (FFT). The magnitude of the Fourier transform of such an image has a strong cosine component with the parallel lines representing the zero points (or troughs). As indicated in FIG. 14*b*, the parallel lines are perpendicular to the direction of the displacement indicated by arrow 150. Furthermore, the line-spacing is inversely related to the magnitude of the displacement with the exact mathematical relationship indicated below.

The result illustrated in FIG. 14*b* follows from Fourier transform theory. FIG. 14*a* may be thought of as a convolution of the first image (indicated with solid lines) with an even impulse pair, i.e., positive delta functions centered about the origin (which provide the translation). The properties of the Fourier transform are such that the Fourier transform of a space-domain convolution is equivalent to the product in the spatial-frequency domain of the Fourier transforms of each space-domain component in the frequency domain. Thus, the Fourier transform represented in FIG. 14*b* is the product of the Fourier transform of the first image and the Fourier transform of the pair of delta functions (which produces the strong cosine component).

For general image alignment tasks, little advance knowledge of the content of the image is available so that it is difficult to predict the characteristics of the Fourier transform of the image. However, the Fourier transform F(x,y) of an even impulse pair f(u,v) is given by:

$$F(x,y) = \cos(\pi x) \tag{3}$$

if the impulse pair is on the horizontal axis. If the impulse pair is rotated counter-clockwise about the origin from the horizontal axis by an angle θ, then the Fourier transform is given by:

$$F(x,y) = \cos\{2\pi(x \cos(\theta) + y \sin(\theta))\} \tag{4}$$

Since the cosine function goes to zero periodically, the result of the product of a cosine function with any other function must also go to zero periodically. Therefore, a detectable pattern is generated regardless of the nature of the image being translated, unless that image is completely blank.

If an image has been rotated, scaled, and translated, a Fourier transform of the entire image would be inefficient since different regions of the image have effectively moved in different directions. Thus, the contributions of individual shifts would obscure the desired result of locating the reference point. However, with small regions at some distance from the center of rotation, there is effectively only a parallel translation to a first-order approximation. Thus, for each of the small test regions 152 illustrated in FIG. 14*c*, the portion of the image contained therein has essentially been linearly shifted. Preferably, test regions 152 are about 64 by 64 pixels. The local linear shifts are indicated generally by arrows 154. The result is that the Fourier transform of each test region 152 will produce a parallel line pattern of zero-magnitude lines, as illustrated in FIG. 14*d*. Again, as in FIG. 14*b*, the parallel line patterns of FIG. 14*d* have spacing inversely proportional to the translation distance 154 at the particular location of the test region, and are oriented perpendicularly to the shift directions.

Figure 14C:
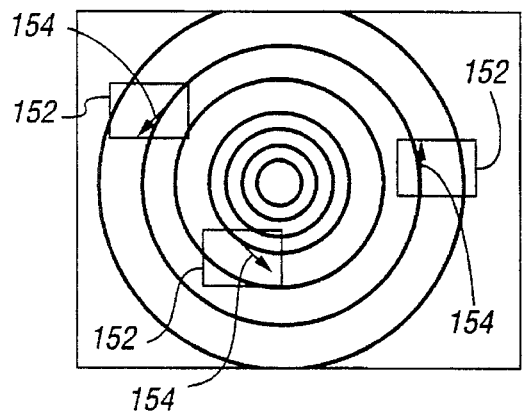
Figure 14D:
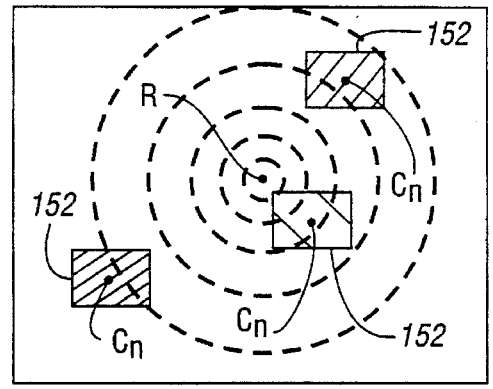

For a Glass pattern produced by a translation and rotation (as shown in FIG. 14*c*), reference point R may be located by extrapolating the center point C of each test region 152 in a direction parallel to the parallel line pattern as illustrated in FIG. 14*d*. In this case, two non-collinear test regions are sufficient to locate reference point R. The regions should be selected so that the extrapolated lines intersect at an angle near 90° for accuracy. However, the third test region may be used to increase the confidence level of the reference point location. Thus, for a translation and rotation, the reference point may be located by computing the Fourier transform in two (2) small test regions, detecting the resulting parallel line pattern, and extrapolating the centers of the test regions in a direction parallel to the line pattern until the extrapolations intersect at the reference point. Further rotation and superposition of the images is not necessary in this case since the line spacing of the parallel line pattern indicates the magnitude of the translation ratio at the particular location of the test region. The location of the reference point can be verified by using other test regions.

It should be recognized that since this method requires a constant amount of computation regardless of the image size, it is a "constant-order" process or algorithm.

Figure 14F:
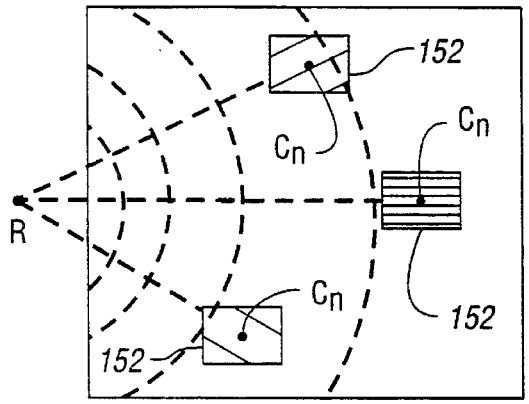
Figure 14G:
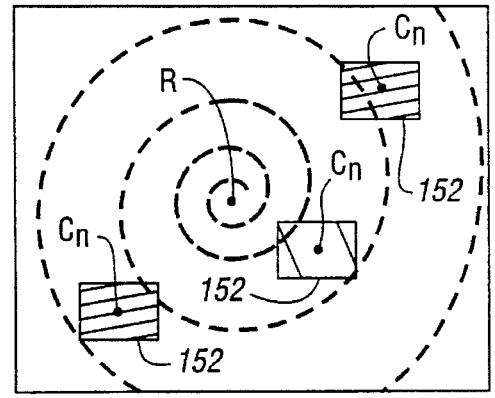
Figure 14E:
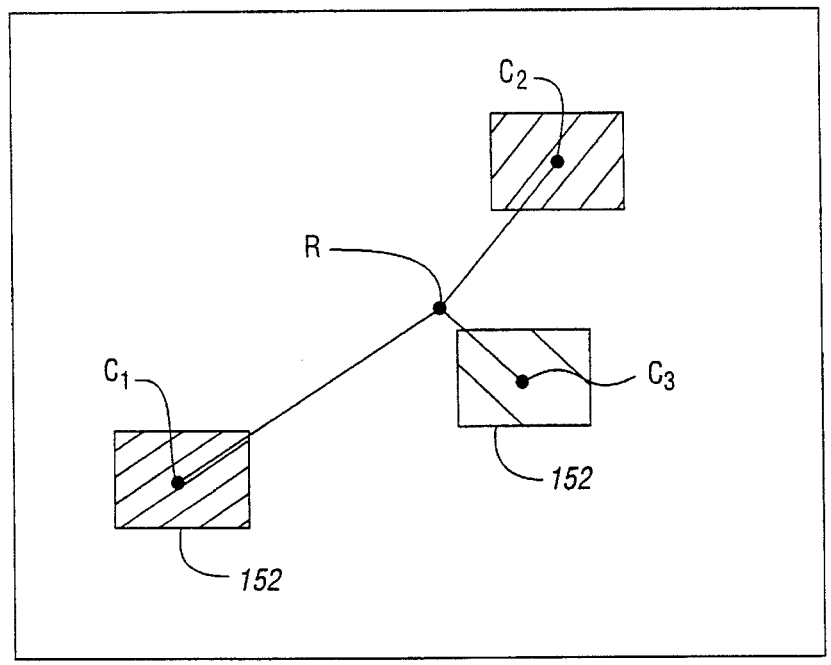

FIG. 14e illustrates the relationship between line spacing of the parallel line cosine patterns and the distance of the test region from the reference point. As shown, the distances between adjacent parallel lines decrease as the distance from the test regions 152 to reference point R increases.

As with the methods previously described, the method illustrated in FIGS. 14a through 14g determines a reference point even if that point contains no information, or is not within the superimposed images. FIG. 14f illustrates a situation in which the reference point is not located within the superimposed images. The method still determines the reference point since the method utilizes the peripheral Glass pattern, not properties of the central region. Thus, this method is capable of aligning images which could not be aligned by prior art methods which searched for a dark or light region immediately surrounding a center of rotation.

FIG. 14g illustrates the method for locating a reference point applied to a spiral Glass pattern produced as a result of translation, rotation, and scaling. In this case, the extrapolations from the centers of test regions 152 do not intersect in a point, but form a bounded region about the reference point R. Three (3) test regions 152 provide sufficient information to determine reference point R since the spacing of each parallel line pattern indicates the proportional distance from that pattern to reference point R. These three (3) known distances may be used in two (2) combinations to solve for the two unknowns corresponding to the coordinates of reference point R. The two (2) solutions provide an estimate of the location and the accuracy of that estimate Since this technique of locating reference points involves a constant-time algorithm, it could be implemented by special purpose electronics, such as an application specific integrated circuit (ASIC) or the like. This method is, therefore, more efficient than exhaustive checking of even 100 possible values for each translation, rotation and scale factor which would require about $10^8$ computations of 2D correlation coefficients, each of which is order $N^2$.

The entire superimposed image could be divided into adjacent test regions, each of which has a corresponding Fourier transform/cosine detector implemented in hardware or software. In addition, an evaluation criterion for each test region would be generated to indicate the confidence level of the detected cosine pattern. Using a voting scheme based on the confidence levels of the various test regions, a predetermined number of "highest" confidence regions could be utilized to generate a posited reference point for the superimposed images. If a sufficient number of regions having the predetermined confidence level are not available, the second image may be further transformed (rotated, scaled, translated, etc.) until a predetermined number of regions meet the confidence criterion.

Thus, confidence in the location of the reference point(s) is increased by an increasing number of test regions which indicate a substantially similar location. Similarly, confidence may be evaluated by further transforming at least one of the images and comparing how the location of the reference point moves relative to its anticipated movement. Once a global transformation has been identified, the same method may be used to identify local characteristics of the images, such as noise, distortions, new objects within one image, or the like. By tracking the global and local transformations indicated by the various test regions over time, information may be gleaned relative to motion of various objects within the images.

Figure 15B:
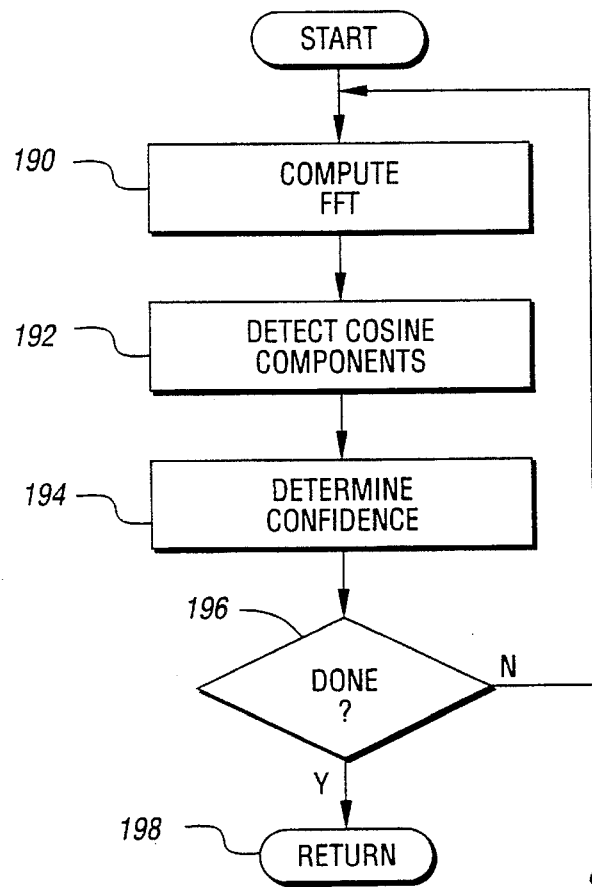
FIGS. 15a and 15b illustrate the details of one implementation of the method illustrated in FIGS. 14a through 14g.
Figure 15A:
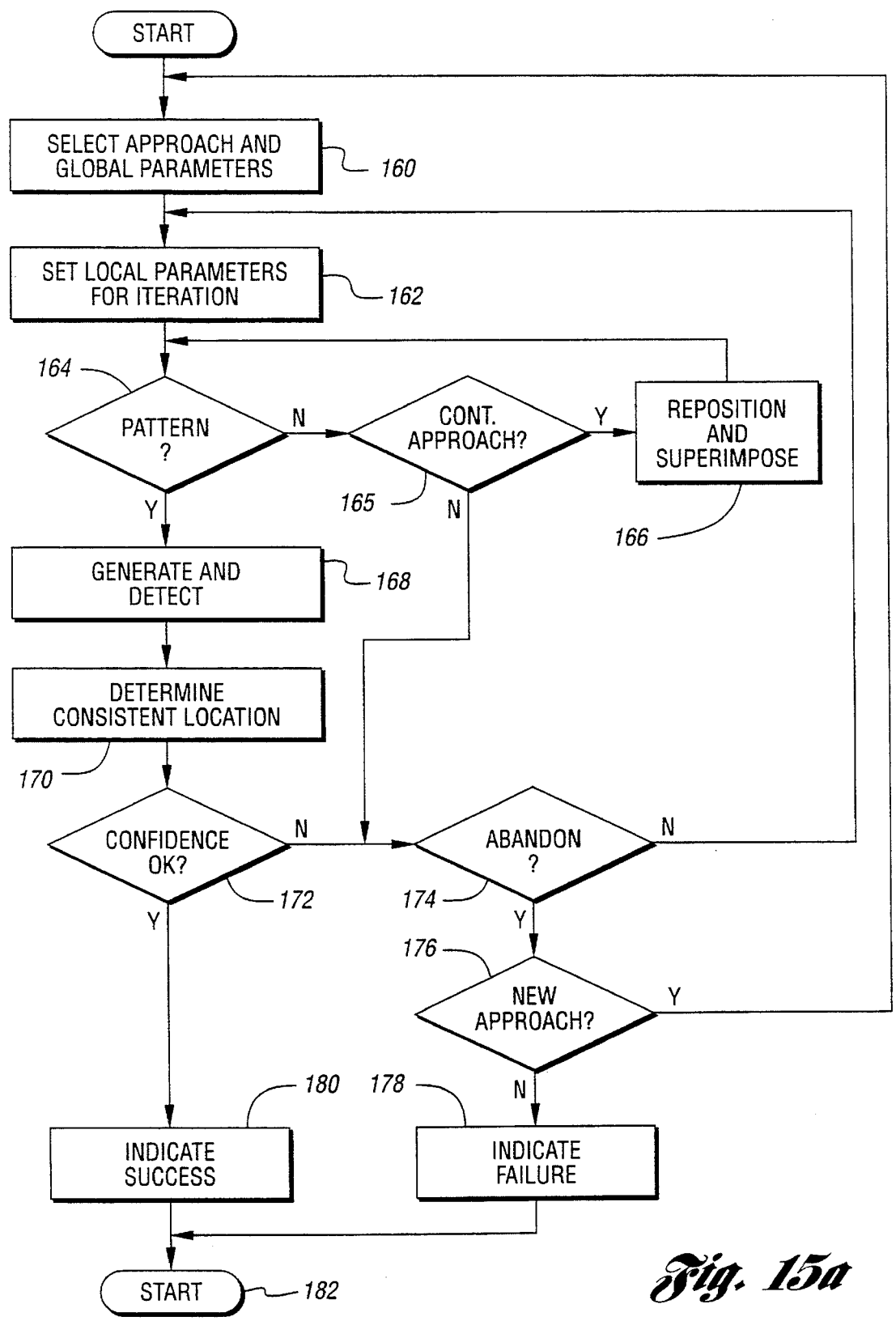

FIGS. 15a and 15b contain flow charts illustrating details of one implementation of the method illustrated in FIGS. 14a through 14g. Of course, the method illustrated in FIGS. 15a and 15b is only a portion of the image alignment method of the present invention as it relates to locating reference points of Glass patterns as discussed above. Step 160 of FIG. 15a includes selecting alignment parameters as discussed above. Step 160 also includes selecting a particular approach for the current alignment attempt. This may include further transforming at least one of the images, applying a filter, applying sparsification, or the like. Step 162 determines local alignment parameters for the current approach and current iteration. Step 164 determines if a Glass pattern has been detected with a sufficient confidence level. If the result of Step 164 is true, the process continues with Step 168. If the result of Step 164 is false, Step 165 performs a test to determine whether to continue with the current approach. If the result of Step 165 is true, Step 166 repositions at least one of the images, superimposes the images and returns to Step 164. If the result of Step 165 is false, the process continues with Step 174.

With continuing reference to FIG. 15a, Step 168 generates and detects a parallel line pattern and assigns a confidence level to that detection. Step 168 is illustrated in greater detail in FIG. 15b which is discussed below. Step 170 determines if a consistent reference point location is indicated by the various test regions. Step 172 determines if a satisfactory confidence level has been achieved. If the result of Step 172 is true, a successful reference point location is indicated at Step 180 and the process continues with Step 182. If the result of Step 172 is false, Step 174 determines if the current approach should be abandoned. Step 174 may consist simply of a counter which completes a predetermined number of iterations of Steps 160 through 172 before signaling a new approach. Alternatively, Step 172 may depend on the particular trend in confidence levels or other such appropriate test.

Still referring to FIG. 15a, if the result of Step 174 is false, the process continues with Step 162. If the result of Step 174 is true, Step 176 determines if a new approach should be attempted. Similar to Step 174, Step 176 may simply repeat a predetermined number of approaches or include a more sophisticated test depending on recent results or the local alignment parameters determined in Step 162. If the result of Step 176 is true, the process continues with Step 160. If the result of Step 176 is false, Step 178 indicates a failure in reliably locating a reference point before returning to the calling routine at Step 182.

FIG. 15b is a flow chart illustrating one implementation of Step 168 of FIG. 15a. Step 190 computes the Fourier transform utilizing an FFT. As with many of the other steps of this method, Step 190 may be implemented by hardware or software. Step 192 detects the cosine components of the FFT computed in Step 190. Step 194 determines a confidence level which indicates the relative "clarity" and consistency of the parallel line pattern generated by the cosine components. Of course Steps 190, 192, and 194 could be combined into a single operation or "filter". Step 196 determines if the necessary computations for all of the test regions have been completed. If the result of Step 196 is true, the process returns via Step 198 to Step 170 of FIG. 15*a*. If the result of Step 196 is false, the process is repeated beginning with Step 190.

System Block Diagram

Figure 16:
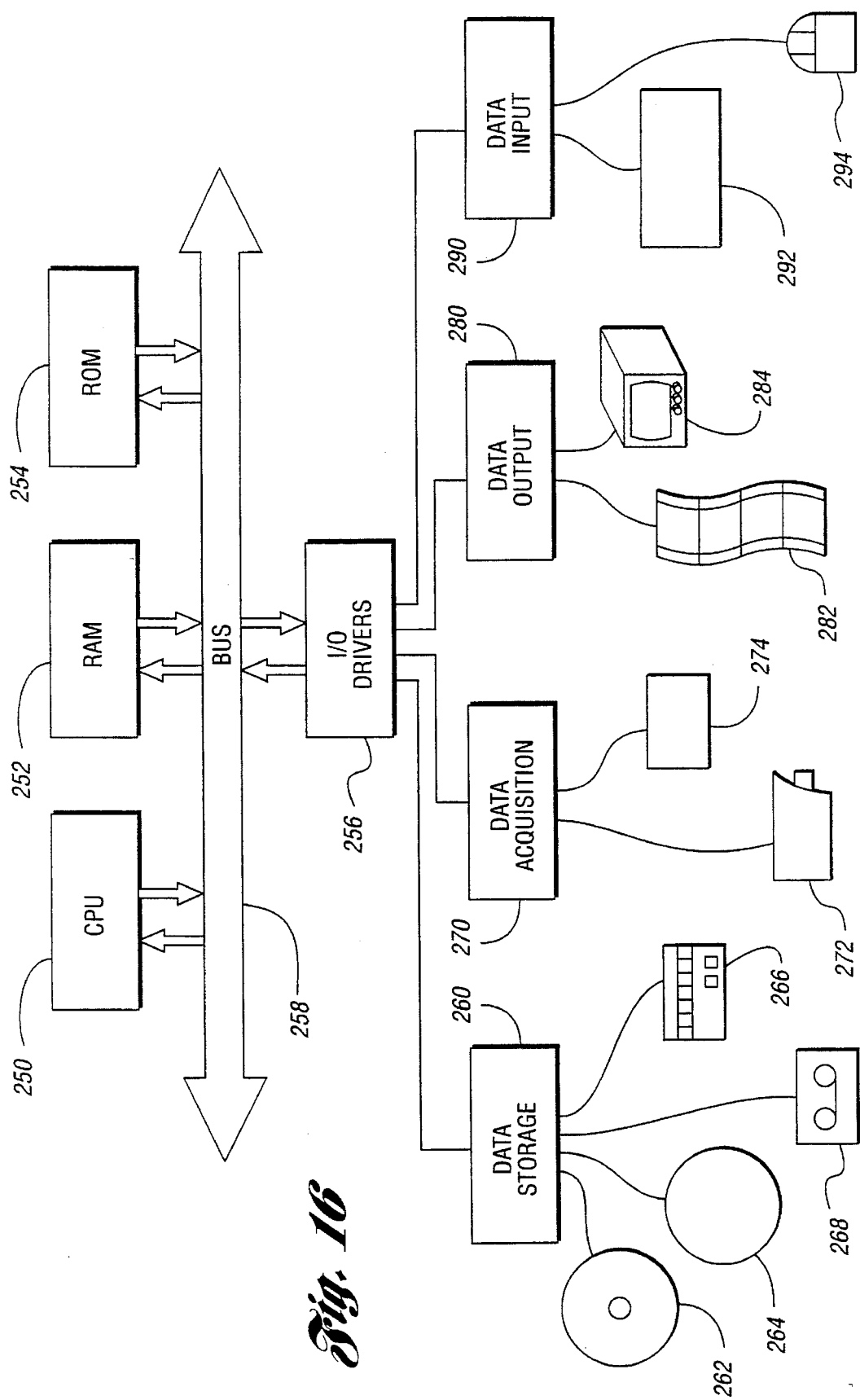
FIG. 16 is a block diagram of the system for aligning images using Glass patterns according to the present invention.

Referring now to FIG. 16, a block diagram is shown which illustrates a system for aligning images using Glass patterns according to the present invention. The system includes a central processing unit (CPU) 250 having a microprocessor in communication with a random-access memory (RAM) 252, a read-only memory (ROM) 254, and input/output (I/O) drivers 256, via a data bus 258. The system also includes peripheral devices in communication with the I/O drivers 256. The peripheral devices include data storage devices 260, data acquisition devices 270, data output devices 280, and data input devices 290.

Still referring to FIG. 16, typical data storage devices 260 which are used to store data representations of images include a compact-disk-ROM (CD-ROM) drive 262, a removable disk drive 264, a fixed disk drive 266, and a magnetic tape drive 268. Typical data acquisition devices 270 may include a camera 272, or a scanner 274 which sample images and generate signals amenable to automated processing. Data output devices 280 may include a printer 282, and a video display 284. Data input devices 290 may include a keyboard 292 and a pointing device 294 such as a mouse or a light pen. Pointing device 294 is used for interactive image alignment according to the present invention.

Still referring to FIG. 16, in operation, CPU 250 processes instructions stored in RAM 252, ROM 254, or instructions received from an operator via data input devices 290 to implement the method for image alignment using Glass patterns according to the present invention. Image data is captured via data acquisition devices 270 and stored in data storage devices 260. Preferably, image data is transferred to RAM 252 to facilitate processing as required. Intermediate and final results of the image alignment are communicated to a user via data output devices 280. Of course, the output of the image alignment system could be utilized by another automated system and transferred via data bus 258 or other high-speed communication link.

Applications

The system and method for image alignment and analysis using Glass patterns as disclosed above has a number of foreseeable applications which are diverse and far-reaching. It is within the contemplation of this invention that the system and method disclosed may be applied to any of the applications previously discussed in this application, as well as numerous others including process control, quality control, motion detection, photolithography (aligning of integrated circuit (IC) chip masks), electronic signature analysis, noise reduction, multi-media applications, virtual reality applications, and precision (vernier) positioning and repositioning. A number of these applications, and similar related applications, are briefly described below.

Fingerprints

Since the system and method of the present invention may be used to align a number of images, it would be ideal for use in identifying or locating fingerprints which match or closely resemble a particular fingerprint, or portion thereof. Thus, in this application, and other similar matching applications, simply detecting a Glass pattern may be adequate. Further alignment operations would then be unnecessary.

Voice Recognition

Similarly, the system and method of the present invention could be an integral part of a voice recognition system, or any other system utilized in signature analysis applications. Such a system may be used to identify voice-prints for a security system, or phonemes in a speech recognition or translation system. These applications match a particular "signature" with a reference template, similar to the fingerprint matching application described above.

As another example, in an image constructed from a "sound-print" of acoustic noise in the ocean, or in an industrial or military monitoring operation. A Glass pattern analysis could be used to provide a comparison of a target signature to a variety of reference signatures produced by known objects or phenomena. The ability of Glass patterns to accommodate scale shifts would allow these systems to accommodate changes due to doppler shifts, distance variations, or the like.

Digital Signal Processing

It is within the contemplation of this invention to utilize the system and method disclosed for any digital signal recognition, matching, or alignment task. For example, consider the task of matching two (2) single-dimensional, time-varying signals. Assume the signal varies among N discrete levels from time t=0 to time t=T. If the time interval is divided into M intervals of length T/M, the average value of the signal over each interval M may be represented by one of N grayscale values corresponding to a single pixel. The signal may then be represented as an image with the first row $R_0$ having M pixels, each having a grayscale value corresponding to the average signal level over one T/M interval. Subsequent rows $R_n$ of the image would represent signal values from time t=n*S to time t=T+(n*S), where S is a time shift selected based on the particular application. Thus, the entire signal will be mapped into M rows of the image.

In a similar fashion, a potential matching signal would be mapped into a second image to be aligned with the first image according to the method of the present invention. Vertical displacement of the matching points would then correspond to time-shifts in the corresponding signals producing circular Glass patterns; whereas, a compression of one of the signals would result in an elliptical Glass pattern.

Navigation

Another group of applications appropriate for the system and method of the present invention includes a number of navigational uses. Such applications often require real-time image alignment to compare a reference or target image to a continuously changing "current" image. For example, an aircraft guidance system may have a reference image of a runway. As the aircraft approaches the runway for a landing, the current image of the runway, as acquired by the aircraft, is aligned with that reference image. Adjustments may then be made to the aircraft approach path so that the actual image of the landing corresponds to the reference image of the landing.

A similar application is in missile guidance systems which must continually compare a currently sensed image to a reference target image to follow a predefined course to the final target.

Other navigation applications include guidance at sea, over celestial bodies (such as a planet, moon, or such), through a desert, jungle, mountains or other terrain having a multitude of similar, indistinct features. Feature-based or statistical correlation techniques are unacceptable for the majority of this type of application.

Recursive use of Glass patterns according to the system and method of the present invention may be utilized in navigation (as a specific example) for purposes other than guidance. The system and method according to the present invention may be utilized in measuring true airspeed (or surface speed) and/or acceleration. An image representing a constant velocity process or event maps into a constant displacement Glass pattern. The constant displacement Glass pattern may be used as a source image which would map constant accelerations of the original objects into constant displacements in the second-order (recursively generated) Glass patterns. Thus position, velocity, and acceleration could be measured optically with exceptional precision. An important advantage of the system and method of the present invention is that the sensitivity of each of these measurements can be easily adjusted by altering the transformation factors between image pairs.

Industrial Applications

Industrial applications of the system and method for aligning and analyzing images according to the present invention include robotic guidance as well as tasks unrelated to locating a center-defining pattern in an image, such as part inspection. Automatic part recognition and orientation for assembly is yet another application suitable for the system and method of the present invention.

In a quality control application, it may be adequate to simply classify the Glass pattern. For example, a particular Glass pattern may be detected to determine if the images are of the same scale, different scales, or unrelated. Thus, in a quality control application monitoring parts at random locations and orientations, comparing the part image to a slightly magnified template image should give a clean starburst Glass pattern regardless of the location or rotation. This would make it possible to identify deviations indication part defects without having to reposition the parts being monitored. This would result in significant improvement in the ease of inspection and the ability to detect small defects.

For other related applications, monitoring changes in the existence, nature, quality (confidence level), or location of the Glass pattern could be what is desired. For example, a sequence of real-time images taken at equally spaced intervals of a continuous sheet (of steel, for example) traveling past a camera, with each image being rotated by some constant angle with respect to the prior image would translate a constant velocity and shape of the sheet into a constant position and type of Glass pattern. Small changes in velocity of the sheet would be magnified as in other Moiré type applications and revealed by a change of the Glass pattern position. This information could be utilized in controlling the underlying process. A change in the shape or quality of the Glass pattern would also reveal changes in the surface of the object being monitored which may relate to the process being controlled.

Yet another example of a change detection application is in video monitoring or surveillance. Two views of a hallway, superimposed to produce a Glass pattern, would have the pattern disrupted if a person were to walk through the field of view. Thus, the system would function as a motion detector or intruder alert. Similarly, such a system could be utilized to detect the arrival of a workpiece on a continuously moving conveyor belt.

Stereoscopic vision

It is also within the contemplation of this invention to utilize the system and method for aligning images using Glass patterns in solving stereoscopic vision problems. In these types of problems, only subfields of the image satisfy a given transformation such that there is a different transformation representing the distance from the observer for each object in the image. The subfields may not be contiguous in the image. For example, an image of a tree with sparse leaves may have a first stereo shift while the background seen through the leaves has a different stereo shift.

A related application involves a moving observer with moving object, such as driving along an expressway in heavy traffic. This type of application is particularly difficult for prior art alignment techniques due to the changing perspective transformation required to align subsequent images with previous ones. Image processing tasks in such applications will benefit greatly from utilization of the system and method for image alignment and analysis according to the present invention.

For other related applications simply monitoring the location of the reference point may be all that is required. For example, a constant velocity of an image region could translate into a constant reference point location. Such a system could be utilized in measuring the velocity of some object, perhaps in real time, by measuring the position of the Glass pattern. If a camera were moving relative to the ground or water with waves, or clouds, while capturing a number of images, this method would reveal the relative velocity of the camera with respect to the background.

Similarly, if the images were of a rotatable or rotating object, the superimposed images could be preprocessed by translating at least one image relative to the other(s). Then, location of the reference point of the Glass pattern would be used to determine the rotational speed of the object. This method could also be used to measure the absolute value of a rotation, with respect to some reference image, with vernier precision. The measurement could then be utilized to return the rotating object to some prior position, such as a home position for a machine arm or tool.

Descintillation

A similar image processing task appropriate for completion by the system and method of the present invention involves alignment of images having local distortions which have an average value of zero. This is a typical problem which arises when viewing a scene through a shimmering atmosphere.

Data Visualization

Another important application of the system and method for image alignment according to the present invention is that of data visualization. Data may be represented as an image to determine similarities and differences between two data sets. This may include locating some data in a database by "matching" the image of the desired data by aligning it with a search template.

Cognitive Maps

One particularly interesting application of data visualization is in locating common areas of belief between communicating agents. This can be thought of as aligning the cognitive maps of the communicating agents. For example, consider a first agent which has a database containing coded information concerning the experiences of that agent, as well as what that agent is currently experiencing or sensing. If the first agent is to cooperate with other agents to achieve a common goal, the first agent must communicate that common goal to the other agents. The first agent must also determine what the other agents have experienced relative to that goal, as well as what the other agents are currently experiencing. Thus, if the goal is for the agents to meet at a specific target object located among similarly featured objects, the agents must locate the common areas of belief as to which object is the target object. This is not a simple task since each agent may be sensing a different "view" of the scene which may include more objects than what an adjacent agent is sensing.

It is understood, of course, that while the form of the invention herein shown and described includes the best mode contemplated for carrying out the invention, it is not intended to illustrate all possible forms thereof. It will also be understood that the words used are descriptive rather than limiting, and that various changes may be made without departing from the spirit and scope of the invention disclosed.

I claim:

1. A method of aligning first and second images containing randomly distributed features wherein the first image is a transformed version of the second image, and neither image is required to contain a periodic pattern, the method comprising:

superimposing the images to form a composite image in which a first Glass pattern having a determinable reference point is produced, said reference point, in turn, defining a pair of matching points, said matching point in each of the two superimposed images being defined to be point in said image collocated at that time with said reference point in said composite image;

repositioning at least once at least one of the images so that superimposition of the randomly distributed features from the superimposed images produces a subsequent composite image having a subsequent Glass pattern having, in turn, a determinable reference point, defining, in turn, a pair of matching points, said pair of matching points being different from the pairs of matching points determined in preceding repositionings; and applying a smooth warping transformation to at least one of the images so as to simultaneously align each pair of matching points in the images so as to align the images.

2. The method of claim 1 wherein simultaneously aligning the reference points comprises determining a relationship between the reference points of the first Glass pattern which relationship also exists between the reference points of the subsequent Glass patterns.

3. The method of claim 2 wherein determining a relationship comprises determining a transformation which includes parameters for at least one of translating, rotating, scaling, and skewing at least one of the images.

4. The method of claim 1 wherein superimposing the images comprises:

creating a numerical representation of each image; and combining the numerical representations of the images to generate a superimposition of the images.

5. The method of claim 4 wherein combining the numerical representations comprises summing corresponding numbers of the numerical representations.

6. The method of claim 1 wherein the step of superimposing the images includes utilizing a computer to determine a reference point.

7. The method of claim 6 wherein a reference point is determined by:

defining a plurality of test regions each having a corresponding center point, the plurality of test regions being disposed within the two superimposed images;

computing a Fourier transform for each of the plurality of test regions to generate a parallel line pattern having substantially equal line spacing within each of the plurality of test regions; and utilizing the line spacing and the corresponding center point of each of the plurality of test regions to determine the reference point.

8. The method of claim 7 wherein defining a plurality of test regions includes positioning each test region adjacent to at least one other test region such that each point disposed within the images is located in one of the plurality of test regions.

9. The method of claim 7 wherein the steps of defining, computing, and utilizing, are repeated a predetermined number of times to monitor movement of the reference point.

10. The method of claim 1 further comprising processing at least one of the images so as to eliminate points which are not of interest as determined by a user of the method, processing being performed prior to superimposing the images.

11. The method of claim 10 wherein the images include pixels characterized by a contrast level and wherein processing at least one of the images prior to superimposing the images comprises adjusting the contrast level of the pixels so that each pixel is no more than half-saturated so as to prevent image saturation during the step of superimposing the images.

12. The method of claim 1 further comprising sparsification of at least one of the images so as to reduce the number of points considered during the alignment process, sparsification being performed prior to superimposing the images.

13. The method of claim 1 wherein the images are N-dimensional where N is an integer greater than unity.

14. The method of claim 1 further comprising:

selecting a subsequent image to be aligned with the most recently aligned image; and repeating the steps of superimposing, repositioning, simultaneously aligning, and selecting, a predetermined number of times so as to align each image in a multiple image sequence.

15. The method of claim 1 further comprising transforming at least one of the images prior to superimposing the images so as to facilitate the formation of a particular Glass pattern.

16. The method of claim 1 further comprising processing the images after simultaneously aligning the reference points so as to enhance an image feature of interest.

17. The method of claim 1 wherein the selected number of subsequent reference points is determined as a function of the group of the Glass pattern produced.

18. The method of claim 1 wherein the selected number of subsequent reference points is specified by a user.

19. The method of claim 1 wherein the selected number of subsequent reference points is determined as a function of recently aligned images, the recently aligned images having similar characteristics to the plurality of images currently being aligned.

20. The method of claim 1 wherein one of the plurality of images has been rotated and translated relative to another image of the plurality of images and wherein the rotation and translation are in the same plane.

21. The method of claim 20 wherein the translation is coplanar with the two images and the rotation is about an axis orthogonal to the two images.

22. The method of claim 20 wherein the two images are coplanar and wherein the translation is along an axis orthogonal to the plane of the two images.

23. The method of claim 22 wherein the rotation is about an axis orthogonal to the plane of the two images.

24. The method of claim 1 wherein the plurality of images comprises two three-dimensional images each having first, second, and third axes each axis corresponding to a single dimension and wherein the second image is translated along its first and second axes relative to the first image.

25. The method of claim 24 wherein the first image is rotated about its third axis, its third axis being mutually orthogonal to the first and second axes of the first image.

26. The method of claim 1 wherein the plurality of images comprises two three-dimensional images and wherein the second image has been perspectively transformed relative to the first image.

27. The method of claim 1 wherein one of the plurality of images includes local distortions having an average value of zero.

28. The method of claim 1 wherein the plurality of images includes first and second images and wherein the first image has been transformed relative to the second image such that a sequential ordering of points in the first image
is maintained in the second image.

29. The method of claim 1 wherein repositioning at least one of the images includes utilizing knowledge of a particular image characteristic to facilitate the repositioning.

30. The method of claim 1 wherein each of the plurality of images represents at least one fingerprint.

31. The method of claim 30 wherein aligning the images is operative to locate a predefined fingerprint within a fingerprint database.

32. The method of claim 1 wherein each of the plurality of images represents at least one voice-print.

33. The method of claim 1 wherein each of the plurality of images represents range information acquired from at least one of a radar system and a sonar system.

34. A method of aligning a first image containing randomly distributed features and having a first coordinate system and a second image which is a transformed version of the first image and having a second coordinate system wherein neither image is required to contain a periodic pattern, comprising:

superimposing the images so that superimposition of the randomly distributed features in the superimposed images produce a first Glass pattern having a determinable reference point in each of the first and second coordinate systems;

for each of a selected number of subsequent reference points, which selected number is determined as a function of the group of the Glass pattern produced, repositioning at least one of the images so that superimposition of the randomly distributed features in the superimposed images produces a subsequent Glass pattern having a determinable reference point in each of the two images, the reference points of the subsequent Glass pattern being different from the reference points of the preceding Glass patterns; and determining a transformation relating the first image to the second image utilizing the coordinates of the reference points, for aligning the reference points of the first Glass pattern and the reference points of the subsequent Glass patterns so as to align the images.

35. A method for determining the transformation parameters for aligning a first image containing randomly distributed features and having a first coordinate system and a second image which is a transformed version of the first image and having a second coordinate system where the second image is translated and rotated relative to the first image, wherein neither image is required to contain a periodic pattern, the method comprising:

superimposing the images so that superimposition of the randomly distributed features in the superimposed images produce a first bull's-eye pattern having a determinable reference point in each of the two images;

determining the location of the reference point of the first bull's-eye pattern in the first and second coordinate systems;

translating at least one of the images so that superimposition of the randomly distributed features in the superimposed images produce a second bull's-eye pattern having a determinable reference point in each of the two images, the reference points of the second bull's-eye pattern being different from the reference points of the first bull's-eye pattern;

determining the location of the reference point of the second bull's-eye pattern in the first and second coordinate systems; and solving a set of simultaneous equations characterizing the relationship between the reference points in the first image and the corresponding reference points in the second image to yield the transformation parameters which relate each point in the first image to a corresponding point in the second image.

36. A method for determining the transformation parameters for aligning a first image containing randomly distributed features having a first coordinate system and a second image which is a transformed version of the first image and having a second coordinate system where the second image is translated and scaled by a uniform factor relative to the first image, wherein neither image is required to contain a periodic pattern, the method comprising:

superimposing the images so that superimposition of the randomly distributed features in the superimposed images produce a first starburst pattern having a determinable reference point in each of the two images;

determining the location of the reference point of the first starburst pattern in the first and second coordinate systems;

translating at least one of the images so that superimposition of the randomly distributed features in the images produce a second starburst pattern having a determinable reference point in each of the two images, the reference points of the second starburst pattern being different from the reference points of the first starburst pattern;

determining the location of the reference point of the second starburst pattern in the first and second coordinate systems; and solving a set of simultaneous equations characterizing the relationship between the reference points in the first image and the corresponding reference points in the second image to yield the transformation parameters which relate each point in the first image to a corresponding point in the second image.

37. A method for aligning two cognitive maps each being represented as an image containing randomly distributed features, each image being a transformed version of the other image and having a corresponding coordinate system, wherein neither image is required to contain a periodic pattern, the method comprising:

superimposing the images so that superimposition of the randomly distributed features in the superimposed images produce a first Glass pattern having a determinable reference point in each of the two images;

for each of a selected number of subsequent reference points, which selected number is determined as a function of the group of the Glass pattern produced, repositioning at least one of the images so that superimposition of the randomly distributed features in the superimposed images produce a subsequent Glass pattern having a determinable reference point in each of the two images, the reference points of the subsequent Glass pattern being different from the reference points of the preceding Glass patterns; and simultaneously aligning the reference points of each of the Glass patterns so as to align the images thereby aligning the cognitive maps.

38. The method of claim 37 wherein the cognitive maps are aligned to locate areas of common belief between the cognitive maps.

39. A method of aligning two images containing randomly distributed features wherein one of the images is a transformed version of the other image, each of the images having a plurality of points, superimposition of randomly distributed features of superimposed images producing a detectable Glass pattern having a determinable reference point upon transformation of the second image relative to the first image and superimposition thereupon, wherein neither image is required to contain a periodic pattern, the method comprising:

(a) mathematically associating a first coordinate system having a first origin with the first image so as to define coordinates within the first coordinate system for each of the plurality of points in the first image;

(b) mathematically associating a second coordinate system having a second origin with the second image so as to define coordinates within the second coordinate system for each of the plurality of points in the second image;

(c) further transforming at least one of the two images;

(d) superimposing the images produced by said step (c) so that the superimposition of randomly distributed features in the superimposed images produce a Glass pattern having a corresponding determinable reference point;

(e) determining coordinates for the reference point in the first and second coordinate systems;

(f) repeating said steps (c)–(e) a predetermined number of times so as to generate a set of reference points;

(g) generating an alignment transformation for the images based on the set of reference points; and (h) applying the alignment transformation to one of the images so as to align the images.

40. The method of claim 39 further comprising preprocessing at least one of the two images to produce a corresponding reference image so as to enhance predetermined features of the at least one preprocessed image prior to said Step (a) for use in said Steps (a)–(h).

41. The method of claim 39 further comprising performing the following steps between said Steps (g) and (h):

applying the alignment transformation determined in said Step (g) to one of the two images to evaluate a global quality and a local quality of the alignment transformation; and repeating said Steps (a)–(g) until the global quality and the local quality of the alignment transformation exceed corresponding predetermined quality parameters.

42. A method for aligning two photographic images containing randomly distributed features wherein one of the images is a transformed version of the other image, the images being captured one moveable translucent media, the images containing at least one identical portion having a substantially similar scale and a substantially similar viewpoint, superimposition of the randomly distributed features of superimposed images producing a detectable Glass pattern having a determinable reference point upon translation and rotation of the second image relative to the first image and superimposition thereupon, wherein neither image is required to contain a periodic pattern, the method comprising:

(a) placing the first image over the second image so as to superimpose the images;

(b) repeatedly moving the first image relative to the second image until a reference point of a Glass pattern is detected;

(c) capturing the reference point by inserting a threaded needle through each image at the location of the reference point, the thread allowing relative movement between the two images;

(d) repeating said steps (b) and (c) a predetermined number of times so as to generate a set of captured reference points; and (e) substantially simultaneously pulling all threads taut so as to align all corresponding pairs of reference points in the set of captured reference points to align the two images.

43. The method of claim 42 further comprising (f) evaluating a global alignment quality by quantifying a deformation of the translucent media produced by said Step (e).

44. A system for aligning first and second images containing randomly distributed features wherein the first image is a transformed version of the second image, the system comprising:

a memory for storing data representative of each of the plurality of images, and for storing instructions which operate on the data; and a processor in communication with the memory for executing the instructions, the instructions being operative to superimpose the images such that a first Glass pattern is produced by superimposition of the randomly distributed features in the superimposed images, the first Glass pattern having a determinable reference point in each of the two images, the instructions also being operative to repetitively reposition at least one of the images so that superimposition of the randomly distributed features in the superimposed images produce a subsequent Glass pattern for each repetition, each subsequent Glass pattern having a determinable reference point in each of the images, the reference points of the subsequent Glass pattern being different from the reference points of the preceding Glass patterns, the instructions also being operative to simultaneously align the reference points of each of the Glass patterns in the two images so as to align the images wherein neither image is required to contain a periodic pattern.

45. A system for aligning first and second images containing randomly distributed features wherein the first image is a transformed version of the second image, wherein neither image is required to contain a periodic pattern, the system comprising:

means for superimposing the images so that superimposition of the randomly distributed features in the superimposed images produce a first Glass pattern having a determinable reference point in each of the images;

means for repetitively repositioning at least one of the images so that superimposition of the randomly distributed features in the superimposed images produce subsequent Glass patterns having a determinable reference point in each of the plurality of images, the reference points of the subsequent Glass patterns being different from the reference points of the preceding Glass patterns; and means for simultaneously aligning the reference points of each of the Glass patterns in the plurality of images so as to align the images.

46. A method for analyzing first and second images containing randomly distributed features wherein the first image is a transformed version of the second image, wherein neither image is required to contain a periodic pattern, the method comprising:

superimposing the images; and detecting a first Glass pattern produced by superimposition of the randomly distributed features in the superimposed images, the glass pattern having a determinable reference point within each of the images so as to indicate a determinable relationship between the images.

47. The method of claim 46 further comprising identifying the Glass pattern as one of the members of the group consisting of a starburst pattern, an elliptical pattern, a circular pattern, a vortical pattern, and a hyperbolic pattern, so as to classify the determinable relationship.

48. The method of claim 46 wherein the at least two images includes a reference image, the method further comprising:

measuring a distance between the determinable reference point and a predetermined point in the reference image so as to indicate an absolute rotation of one of the plurality of images.

* * * * *